US012811997B2

(12) United States Patent
Li

(10) Patent No.: US 12,811,997 B2
(45) Date of Patent: Nov. 24, 2026

(54) METHOD AND APPARATUS FOR PROCESSING MEDIA STREAM, COMPUTER DEVICE, AND STORAGE MEDIUM

(71) Applicant: TENCENT TECHNOLOGY (SHENZHEN) COMPANY LIMITED, Shenzhen (CN)

(72) Inventor: Zhicheng Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 58 days.

(21) Appl. No.: 18/903,306

(22) Filed: Oct. 1, 2024

(65) Prior Publication Data

US 2025/0023936 A1 Jan. 16, 2025

Related U.S. Application Data

(63) Continuation of application No. PCT/CN2023/125134, filed on Oct. 18, 2023.

(30) Foreign Application Priority Data

Nov. 30, 2022 (CN) ........................ 202211516657.4

(51) Int. Cl.
*H04L 65/70* (2022.01)

(52) U.S. Cl.
CPC .................................. *H04L 65/70* (2022.05)

(58) Field of Classification Search
CPC ......... H04L 65/10; H04L 65/40; H04L 65/60; H04L 67/28; H04N 21/23; H04N 21/25;
(Continued)

(56) References Cited

U.S. PATENT DOCUMENTS

2007/0113246 A1 5/2007 Xiong
2012/0099672 A1 4/2012 Wan et al.
(Continued)

FOREIGN PATENT DOCUMENTS

CN 101160967 A 4/2008
CN 102118357 A 7/2011
(Continued)

OTHER PUBLICATIONS

The World Intellectual Property Organization (WIPO) International Search Report for PCT/CN2023/125134 Jan. 12, 2024 5 Pages (including translation).

*Primary Examiner* — Glenford J Madamba
(74) *Attorney, Agent, or Firm* — ANOVA LAW GROUP, PLLC

(57) ABSTRACT

A method for processing a media stream includes: determining a cloud application and an interaction room created in the cloud application, and obtaining, during running of the cloud application, media-stream processing capability information of terminals joining the interaction room for interaction; performing adaptive encoding on media data in the interaction room based on the media-stream processing capability information, to obtain at least one type of media stream for the terminals in the interaction room, a media-stream parameter of the at least one type of media stream matching the media-stream processing capability information; determining a media stream matching a subset of the terminals in the interaction room, the media stream being selected from the at least one type of media stream based on media-stream processing capability information of the subset of the terminals; and delivering the media stream to the subset of the terminals in the interaction room.

20 Claims, 9 Drawing Sheets

(58) Field of Classification Search
CPC ........ H04N 21/26; H04N 21/44; H04N 19/12; H04N 19/14; H04N 19/18
USPC .......................................................... 709/217
See application file for complete search history.

(56) References Cited

U.S. PATENT DOCUMENTS

| | | | | |
|---|---|---|---|---|
| 2014/0376623 A1* | 12/2014 | Good | ............... | H04N 21/23439 375/240.07 |
| 2017/0054770 A1* | 2/2017 | Wells | ...................... | H04L 65/65 |
| 2020/0029081 A1* | 1/2020 | Good | ................... | H04N 19/196 |
| 2020/0092562 A1* | 3/2020 | Choi | ................ | H04N 21/25858 |

FOREIGN PATENT DOCUMENTS

| | | |
|---|---|---|
| CN | 103036888 A | 4/2013 |
| CN | 106817628 A | 6/2017 |
| CN | 114489891 A | 5/2022 |

* cited by examiner

METHOD AND APPARATUS FOR PROCESSING MEDIA STREAM, COMPUTER DEVICE, AND STORAGE MEDIUM

CROSS-REFERENCES TO RELATED APPLICATIONS

This application is a continuation application of PCT Patent Application No. PCT/CN2023/125134, filed on Oct. 18, 2023, which claims priority to Chinese Patent Application No. 2022115166574, entitled "METHOD AND APPARATUS FOR PROCESSING MEDIA STREAM, COMPUTER DEVICE, AND STORAGE MEDIUM" and filed on Nov. 30, 2022, the entire contents of both of which are incorporated herein by reference.

FIELD OF THE TECHNOLOGY

The present disclosure relates to the field of computer technologies, and in particular, to a method and an apparatus for processing a media stream, a computer device, a storage medium, and a computer program product.

BACKGROUND OF THE DISCLOSURE

With the development of computer technologies, an increasing quantity and diversities of cloud applications are implemented based on cloud technologies, such as cloud games. In a cloud application, an application service is run on a cloud server, and the cloud server delivers an audio/video stream having been rendered by the application service to a terminal for playing. Therefore, the terminal does not need to perform complex processing, and requirements on device conditions of the terminal can be reduced.

However, when the rendered audio/video stream is delivered to different terminals having different device conditions, it is difficult to achieve a balance between smooth playing and high sound quality and image quality in the terminals, and a problem of freezing or low sound quality and image quality during playing is prone to occur, leading to a poor playing effect of the media stream.

SUMMARY

According to various embodiments provided in the present disclosure, a method and an apparatus for processing a media stream, a computer device, a computer-readable storage medium, and a computer program product are provided.

According to an aspect, the present disclosure provides a method for processing a media stream. The method is performed by a computer device, and includes: determining a cloud application and an interaction room created in the cloud application, and obtaining, during running of the cloud application, media-stream processing capability information of terminals joining the interaction room for interaction; performing adaptive encoding on media data to be delivered in the interaction room based on the media-stream processing capability information, to obtain at least one type of media stream for the terminals in the interaction room, a media-stream parameter of the at least one type of media stream matching the media-stream processing capability information; determining a media stream matching a subset of the terminals in the interaction room, the subset of the terminals including at least part of the terminals, the media stream being selected from the at least one type of media stream based on media-stream processing capability information of the subset of the terminals; and delivering the media stream to the subset of the terminals in the interaction room.

According to another aspect, the present disclosure further provides an apparatus for processing a media stream. The apparatus includes: a module for obtaining information about a processing capability, configured to determine a cloud application and an interaction room created in the cloud application, and obtain, during running of the cloud application, media-stream processing capability information of terminals joining the interaction room for interaction; a media-data encoding module, configured to perform adaptive encoding on media data to be delivered in the interaction room based on the media-stream processing capability information, to obtain at least one type of media stream for the terminals in the interaction room, a media-stream parameter of the at least one type of media stream matching the media-stream processing capability information; a media-stream determining module, configured to determine a media stream matching a subset of the terminals in the interaction room, the subset of the terminals including at least part of the terminals, the media stream being selected from the at least one type of media stream based on media-stream processing capability information of the subset of the terminals; and a media-stream delivering module, configured to deliver the media stream to the subset of the terminals in the interaction room.

According to another aspect, the present disclosure provides a method for processing a media stream. The method is performed by a computer device, and includes: running a cloud application, creating an interaction room based on the cloud application, and determining, during running of the cloud application, at least one type of media stream for terminals in the interaction room, the at least one type of media stream being obtained by a server by performing adaptive encoding on media data to be delivered in the interaction room based on media-stream processing capability information of the terminals joining the interaction room for interaction, and a media-stream parameter of the at least one type of media stream matching the media-stream processing capability information; determining a media stream matching a subset of the terminals in the interaction room, the subset of the terminals including at least part of the terminals, the media stream being selected from the at least one type of media stream based on media-stream processing capability information of the subset of the terminals; and obtaining the media stream, and playing the media stream.

According to another aspect, the present disclosure further provides an apparatus for processing a media stream. The apparatus includes: a media-stream determining module, configured to run a cloud application, create an interaction room based on the cloud application, and determine, during running of the cloud application, at least one type of media stream for terminals in the interaction room, the at least one type of media stream being obtained by a server by performing adaptive encoding on media data to be delivered in the interaction room based on media-stream processing capability information of the terminals joining the interaction room for interaction, and a media-stream parameter of the at least one type of media stream matching the media-stream processing capability information; a media-stream selection module, configured to determine a media stream matching a subset of the terminals in the interaction room, the subset of the terminals including at least part of the terminals, the media stream being selected from the at least one type of media stream based on media-stream processing capability information of the subset of the terminals; and a media-stream obtaining module, configured to obtain the media stream, and play the media stream.

According to another aspect, the present disclosure further provides a computer device, including a memory and a processor. The memory has computer-readable instructions stored therein, and the processor, when executing the computer-readable instructions, performs operations of the method embodiments of the present disclosure.

According to another aspect, the present disclosure further provides a non-transitory computer-readable storage medium, having computer-readable instructions stored therein. When the computer-readable instructions are executed by a processor, operations of the method embodiments of the present disclosure are performed.

Details of one or more embodiments of the present disclosure are provided in the accompanying drawings and descriptions below. Other features, objectives, and advantages of the present disclosure become apparent from the specification, the accompanying drawings, and claims.

DESCRIPTION OF EMBODIMENTS

The technical solutions in embodiments of the present disclosure are clearly and completely described below with reference to the accompanying drawings of the embodiments of the present disclosure. It is clear that the described embodiments are a part of the embodiments of the present disclosure, rather than all of the embodiments. Based on the embodiments of the present disclosure, all other embodiments obtained by a person of ordinary skill in the art without creative efforts shall fall within the protection scope of the present disclosure.

Figure 1:
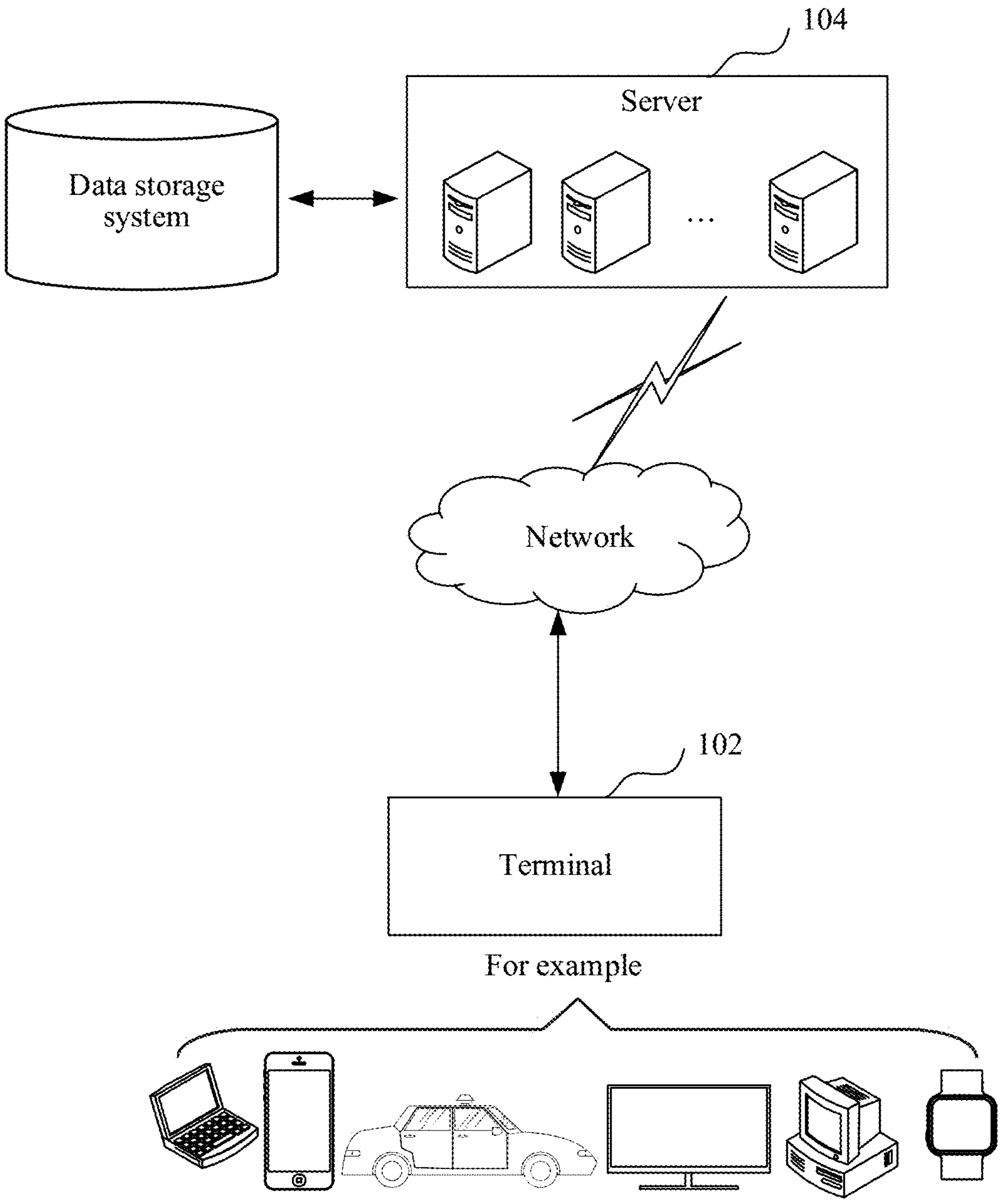
FIG. 1 is a diagram of an application environment of a method for processing a media stream according to an embodiment.

A method for processing a media stream provided in the embodiments of the present disclosure may be applied to an application environment shown in FIG. 1. Terminals 102 communicate with a server 104 through a network. A data storage system may store data that needs to be processed by the server 104. The data storage system may be integrated on the server 104, may be separately disposed, or may be disposed on a cloud or in another server. The terminals 102 may join an interaction room of a cloud application run on the server 104, to implement interaction based on the cloud application in the interaction room, for example, perform various interaction such as social communication and a game battle. During running of the cloud application, the server 104 performs adaptive encoding on to-be-delivered media data based on media-stream processing capability information of the terminals 102 joining the interaction room of the cloud application for interaction, to obtain at least one type of media stream whose media-stream parameter matches the media-stream processing capability information. The server 104 determines, from the at least one type of media stream, a to-be-delivered media stream selected based on media-stream processing capability information of a subset of the terminals, the subset of the terminals including at least part of the terminals and delivers the to-be-delivered media stream to the subset of the terminals. The subset of the terminals may be at least one of the terminals 102.

The method for processing a media stream provided in the embodiments of the present disclosure may be applied to the application environment shown in FIG. 1. The terminals 102 may join the interaction room of the cloud application run on the server 104, to implement interaction based on the cloud application in the interaction room, for example, perform various interaction such as social communication and a game battle. During running of the cloud application, the subset of the terminals joining the interaction room determine the at least one type of media stream for the terminals 102 in the interaction room of the cloud application. The at least one type of media stream is obtained by the server 104 by performing adaptive encoding on the to-be-delivered media data in the interaction room based on the media-stream processing capability information of the terminals 102 joining the interaction room for interaction, and the media-stream parameter of the at least one type of media stream matches the media-stream processing capability information, the subset of the terminals determine, from the at least one type of media stream, the to-be-delivered media stream selected based on the media-stream processing capability information of the subset of the terminals, and obtain the to-be-delivered media stream for playing. The subset of the terminals may be at least one of the terminals 102.

The terminal 102 may be, but is not limited to, various desktop computers, a notebook computer, a smartphone, a tablet computer, an Internet of Things device, and a portable wearable device. The Internet of Things device may be a smart speaker, a smart television, a smart air conditioner, a smart vehicle-mounted device, or the like. The portable wearable device may be a smart watch, a smart bracelet, a head-mounted device, or the like. The server 104 may be an independent physical server, a server cluster or distributed system including a plurality of physical servers, or a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The terminal 102 and the server 104 may be connected directly or indirectly in a wired or wireless communication manner. This is not limited in the present disclosure.

Figure 2:
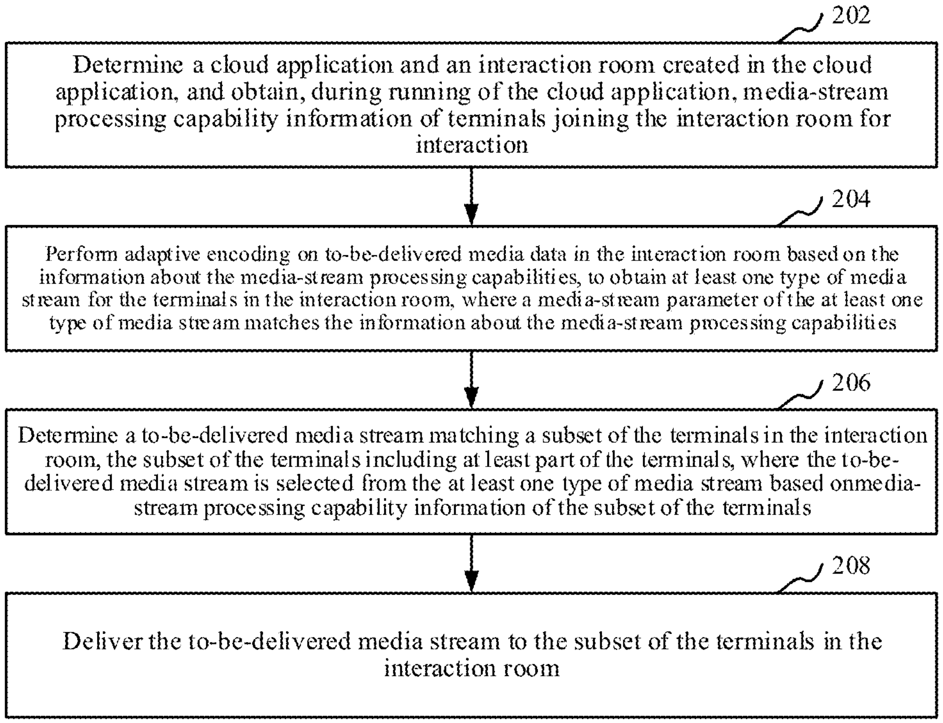
FIG. 2 is a schematic flowchart of a method for processing a media stream according to an embodiment.

In an embodiment, as shown in FIG. 2, a method for processing a media stream is provided. The method is performed by a computer device. Specifically, the method may be independently performed by a computer device such as a terminal or a server, or may be jointly performed by the terminal and the server. In this embodiment of the present disclosure, an example in which the method is applied to the server in FIG. 1 is used for description. The method includes the following operations.

Operation 202: Determine a cloud application and an interaction room created in the cloud application, and obtain, during running of the cloud application, media-stream processing capability information of terminals joining the interaction room for interaction.

The cloud application refers to an application implemented based on a cloud technology, and may be run by a cloud server. The cloud technology is a hosting technology that unifies a series of resources such as hardware, software, and a network in a wide area network or a local area network to calculate, store, process, and share data. The cloud technology is a general name of a network technology, an information technology, an integration technology, a platform management technology, an application technology, and the like that are applied based on a cloud-computing business mode. A resource pool may be formed and used on demand, which is flexible and convenient. A cloud computing technology is to become an important support. A background service of a technical network system, such as a video network, a picture network, or more web portals, needs a large quantity of computing and storage resources. With the high development and wide application of the Internet industry, each item may have an own recognition identifier in the future, and all the recognition identifiers need to be transmitted to a background system for logical processing. Data at different levels is processed separately. Data in all industries requires a strong system for support, which can only be implemented through cloud computing. During specific application, the cloud application may be a cloud game. Cloud gaming may also be referred to as gaming on demand, and is an online game technology that is based on the cloud computing technology. The technology of the cloud game enables a thin client with limited graphics processing and data computing capabilities to run a high-quality game. In a scenario of a cloud game, the game is run on a cloud server instead of a game terminal of a player. The cloud server renders a game scene into a video/audio stream, and transmits the video/audio stream to the game terminal of the player via a network. The game terminal of the player does not need to have strong graphics computing and data processing capabilities, but only needs to have a basic streaming-media playing capability and a capability of obtaining an instruction inputted by the player and transmitting the instruction to the cloud server.

The interaction room refers to virtual interaction space created in the cloud application. Users belonging to a same interaction room may interact in the interaction room. In the interaction room, the users may implement various forms of interaction, such as a game battle and dialog communication. For example, the cloud application is a cloud game, and users joining a same interaction room of the cloud game may perform interaction of a game battle. In addition, for the users joining the interaction room, the users may interact with each other in different manners. For example, for an interaction room of a cloud game, a user A and a user B may perform battle interaction, and a user C may perform battle-watching interaction for the battle interaction between the user A and the user B. In this case, the user A, the user B, and the user C all need to obtain media data in the interaction room. A quantity of the terminals joining the interaction room of the cloud application for interaction may be one or at least two. The information about the media-stream processing capability may be configured for describing a processing capability of the terminal for a media stream, and may be specifically a processing capability for a downlink media stream. For example, the information about the media-stream processing capability may include, but is not limited to, information about various capabilities such as a bit rate, a frame rate, and a decoding format supported by the terminal. Due to different device conditions of different devices, for example, a difference between hardware of the terminals or a difference between networks of the terminals, the different devices may have different media-stream processing capability information. For example, a terminal having a good network condition can support smooth processing of a media stream with a larger bit rate. A terminal having strong decoding performance can support a better media-stream decoding algorithm, to decode a media stream. The information about the media-stream processing capability may be obtained by the server by performing detection on the terminal in the interaction room, may be obtained by performing querying based on identification information of the terminal in the interaction room, or may be obtained through reporting by the terminal in the interaction room.

Specifically, the server may determine the run cloud application and the interaction room created in the cloud application. During running of the cloud application, a user may join the interaction room of the cloud application by using the terminal, to perform interaction in the interaction room. The server detects a participating member in the interaction room of the cloud application, and obtains the information about the media-stream processing capability of the terminal joining the interaction room. During specific implementation, the server may transmit, to the terminal joining the interaction room, a request for the information about the processing capability, to indicate the terminal to report the information about the media-stream processing capability corresponding to the terminal. In addition, the server may alternatively directly perform querying based on the identification information of the terminal, to obtain the information about the corresponding media-stream processing capability, or may perform detection on or evaluate the terminal, to obtain the information about the media-stream processing capability of the terminal.

Operation 204: Perform adaptive encoding on to-be-delivered media data in the interaction room based on the media-stream processing capability information, to obtain at least one type of media stream for the terminals in the interaction room, where a media-stream parameter of the at least one type of media stream matches the media-stream processing capability information.

The media data belongs to downlink data in the cloud application. To be specific, the media data is data that needs to be delivered to the terminals by the server. The media data is data generated during interaction performed by the user by using the cloud application, and specific data content and a data type are related to the cloud application. For example, the media data may include game video data. The server delivers the game video data to each terminal participating in a cloud game, and the game video data is played in each terminal, to run the cloud game. The media data may be generated by the server based on operation information of each terminal with reference to running information of the cloud application. For example, the game video data may be generated through rendering. The adaptive encoding refers to adaptive encoding performed for the information about the media-stream processing capability of the terminal in the interaction room. Different media-stream processing capability information may correspond to different encoding conditions, and different media streams are obtained through encoding, so that media-stream parameters of the obtained media streams satisfy the corresponding encoding conditions.

The media stream is media encoded data obtained by encoding the media data. The media data is encoded, so that the media data can be compressed. The media stream obtained through encoding is transmitted and stored, so that a data volume can be reduced, transmission efficiency of the media data can be improved, and storage space of the media data can be saved. The media-stream parameter refers to an attribute parameter of the media stream, and may specifically include, but is not limited to, at least one of various attribute parameters including an encoding format, a resolution, a frame rate, a bit rate, and the like. A specific type of the media-stream parameter may be flexibly set based on an actual requirement, for example, may be correspondingly set based on a type of the cloud application. Media streams with different media-stream parameters match different processing conditions, for example, match different decoding formats, network transmission conditions, or playing conditions. That the media-stream parameter of the media stream matches the information about the media-stream processing capability may mean that the terminal having the corresponding information about the media-stream processing capability supports smooth processing of the media stream. Specifically, the information about the media-stream processing capability of the terminal may cover the media-stream parameter of the media stream. For example, the media-stream processing capability represented by the information about the media-stream processing capability supports the encoding format of the media stream, a resolution in the media-stream processing capability represented by the information about the media-stream processing capability is not less than the resolution of the media stream, a frame rate in the media-stream processing capability represented by the information about the media-stream processing capability is not less than the frame rate of the media stream, or a bit rate in the media-stream processing capability represented by the information about the media-stream processing capability is not less than the bit rate of the media stream. Therefore, terminals having different media-stream processing capability information are supported in selecting proper media streams for processing, for example, performing processing such as transmitting, decoding, or playing, so that a processing effect of the media stream can be ensured.

Specifically, the server obtains the to-be-delivered media data in the interaction room, and performs adaptive encoding on the media data based on the media-stream processing capability information of the terminals in the interaction room, to obtain the at least one type of media stream. A quantity of types of the media streams may be determined based on the media-stream processing capability information. When a quantity of terminals whose respective media-stream processing capability information greatly differs in the interaction room is greater, more types of media streams need to be obtained through encoding, to be adapt to the terminals. Different types of media streams may have different media-stream parameters, and the media-stream parameter of the media stream matches the information about the media-stream processing capability. For example, if three terminals, respectively a terminal A, a terminal B, and a terminal C, join an interaction room 1 for interaction, if information about a media-stream processing capability of the terminal A, information about a media-stream processing capability of the terminal B, and information about a media-stream processing capability of the terminal C greatly differ, the server may generate, through encoding, three types of media streams for the interaction room. The media-stream processing capability information respectively matches one type of the media streams. For another example, two terminals, respectively a terminal D and a terminal E, join an interaction room 2 for interaction. If information about a media-stream processing capability of the terminal D and information about a media-stream processing capability of the terminal E slightly differ, the server may encode one type of media stream for the interaction room. A media-stream parameter of the media stream matches both the information about the media-stream processing capability of the terminal D and the information about the media-stream processing capability of the terminal E.

Operation 206: Determine a to-be-delivered media stream matching a subset of the terminals in the interaction room, the subset of the terminals including at least part of the terminals, where the to-be-delivered media stream is selected from the at least one type of media stream based on media-stream processing capability information of the subset of the terminals.

The subset of the terminals belong to the terminals joining the interaction room of the cloud application for interaction. The subset of the terminals may be at least a part of the terminals joining the interaction room of the cloud application for interaction, and are terminals currently aiming at delivering processing of media streams. The to-be-delivered media stream is a media stream that needs to be delivered to the subset of the terminals. The to-be-delivered media stream is selected and determined from the at least one type of media stream based on the media-stream processing capability information of the subset of the terminals. Specifically, the to-be-delivered media stream may be selected by the server from the at least one type of media stream based on the media-stream processing capability information of the subset of the terminals. Alternatively, the to-be-delivered media stream may be selected by the subset of the terminals from the at least one type of media stream based on the media-stream processing capability information of the subset of the terminals.

Specifically, the server determines the to-be-delivered media stream matching the subset of the terminals in the interaction room. For example, the server may determine the subset of the terminals that need to deliver media streams, the subset of the terminals are at least a part of the terminals joining the interaction room. In other words, a quantity of the subset of the terminals may be one or more. The server may select, from the at least one type of media stream based on the determined subset of the terminals and the media-stream processing capability information of the subset of the terminals, the to-be-delivered media stream that can be smoothly processed by the subset of the terminals.

Operation 208: Deliver the to-be-delivered media stream to the subset of the terminals in the interaction room.

Specifically, after determining the to-be-delivered media stream, the server delivers the determined to-be-delivered media stream to the subset of the terminals in the interaction room. After receiving the to-be-delivered media stream, the subset of the terminals may decode and play the to-be-delivered media stream.

Figure 3:
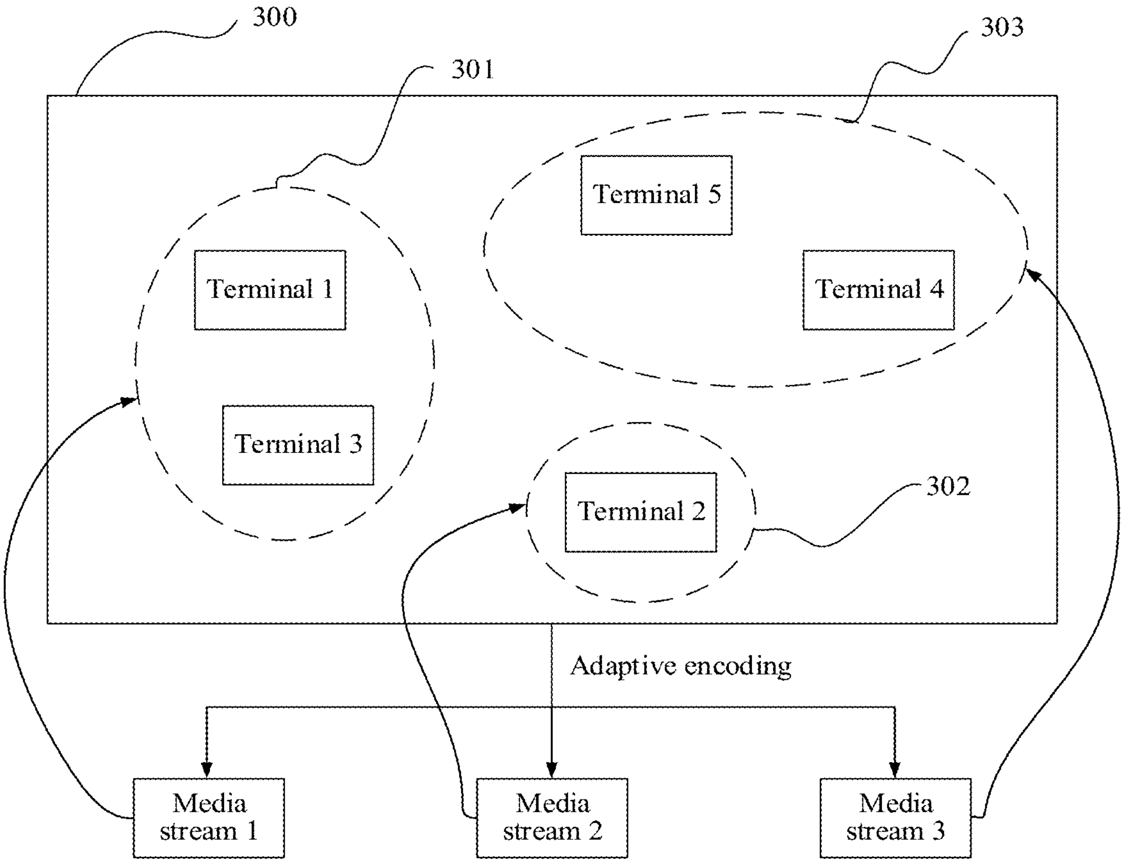
FIG. 3 is a schematic block diagram of a method for processing a media stream according to an embodiment.

During specific implementation, as shown in FIG. 3, five terminals: a terminal 1, a terminal 2, a terminal 3, a terminal 4, and a terminal 5, join an interaction room 300 created in a cloud application. The terminal 1 and the terminal 3 have same information 301 about a media-stream processing capability, the terminal 2 has information 302 about a media-stream processing capability, and the terminal 4 and the terminal 5 have same information 303 about a media-stream processing capability. That is, the five terminals in the interaction room 300 have three types of media-stream processing capability information. Based on this, a server performs adaptive encoding on to-be-delivered media data in the interaction room 300, and generates three types of media streams: a media stream 1, a media stream 2, and a media stream 3. A media-stream parameter of the media stream 1 matches the information 301 about the media-stream processing capability, a media-stream parameter of the media stream 2 matches the information 302 about the media-stream processing capability, and a media-stream parameter of the media stream 3 matches the information 303 about the media-stream processing capability. When delivering the media streams for the terminals in the interaction room 300, the server may transmit the media stream 1 to the terminal 1 and the terminal 3, transmit the media stream 2 to the terminal 2, and transmit the media stream 3 to the terminal 4 and the terminal 5.

Figure 4:
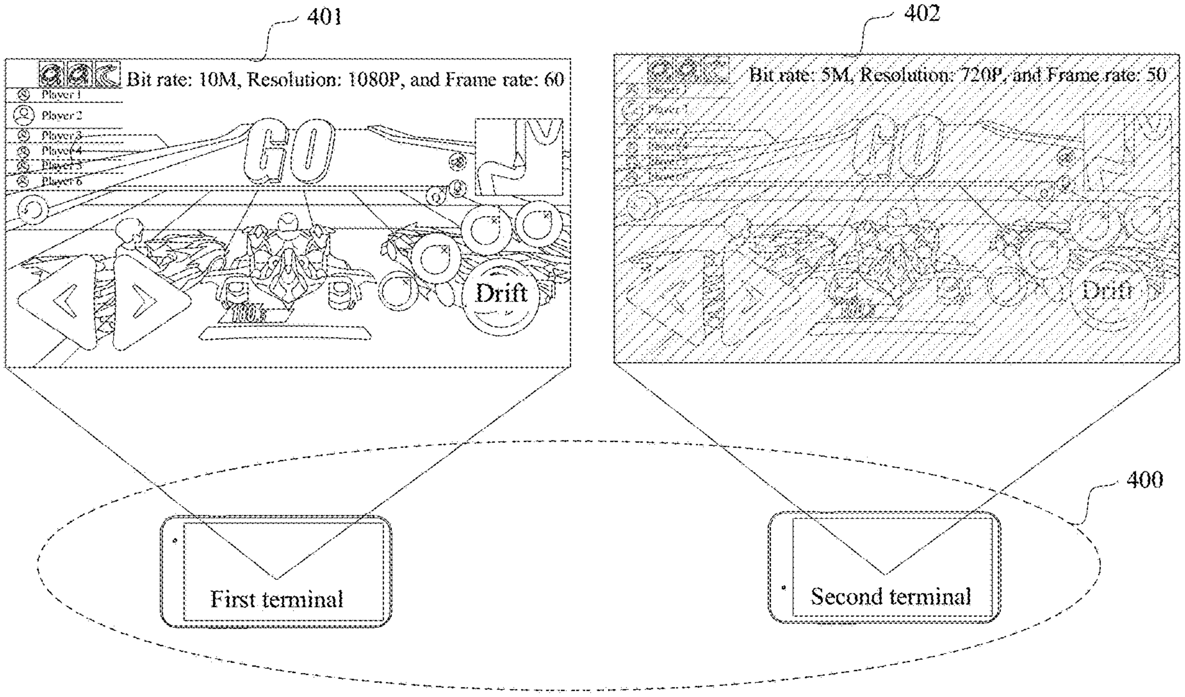
FIG. 4 is a schematic diagram of interfaces of different video streams displayed by different terminals according to an embodiment.

In a specific application, as shown in FIG. 4, two users interact through a cloud application by using different terminals. Specifically, the two users battle through a cloud game. Both a first terminal and a second terminal join an interaction room of the cloud game. As shown by a dashed line, the first terminal and the second terminal join the same interaction room 400. Information about a media-stream processing capability of the first terminal and information about a media-stream processing capability of the second terminal are different, and the first terminal and the second terminal each display a battle picture of the cloud game. The first terminal displays a battle picture 401 with a bit rate of 10 Mb/s, that is, 10M bits per second, a resolution of 1080P, and a frame rate of 60 frames per second. The second terminal displays a battle picture 402 with a bit rate of 5 Mb/s, that is, 5M bits per second, a resolution of 720P, and a frame rate of 50 frames per second. The visual effects of the battle picture 401 displayed on the first terminal is clearer and smoother. The media-stream processing capability of the first terminal is stronger than the media-stream processing capability of the second terminal. As a result, the first terminal obtains, from the server, a video stream with a higher bit rate, a higher resolution, and a higher frame rate, and can smoothly play the video stream. However, the media-stream processing capability of the second terminal is weaker. The second terminal may obtain, from the server, a video stream with a lower bit rate, a lower resolution, and a lower frame rate, and can also smoothly play the video stream. Therefore, playing smoothness and playing quality of the media stream in the terminal are effectively balanced, so that a playing effect of the media stream is improved.

Figure 5:
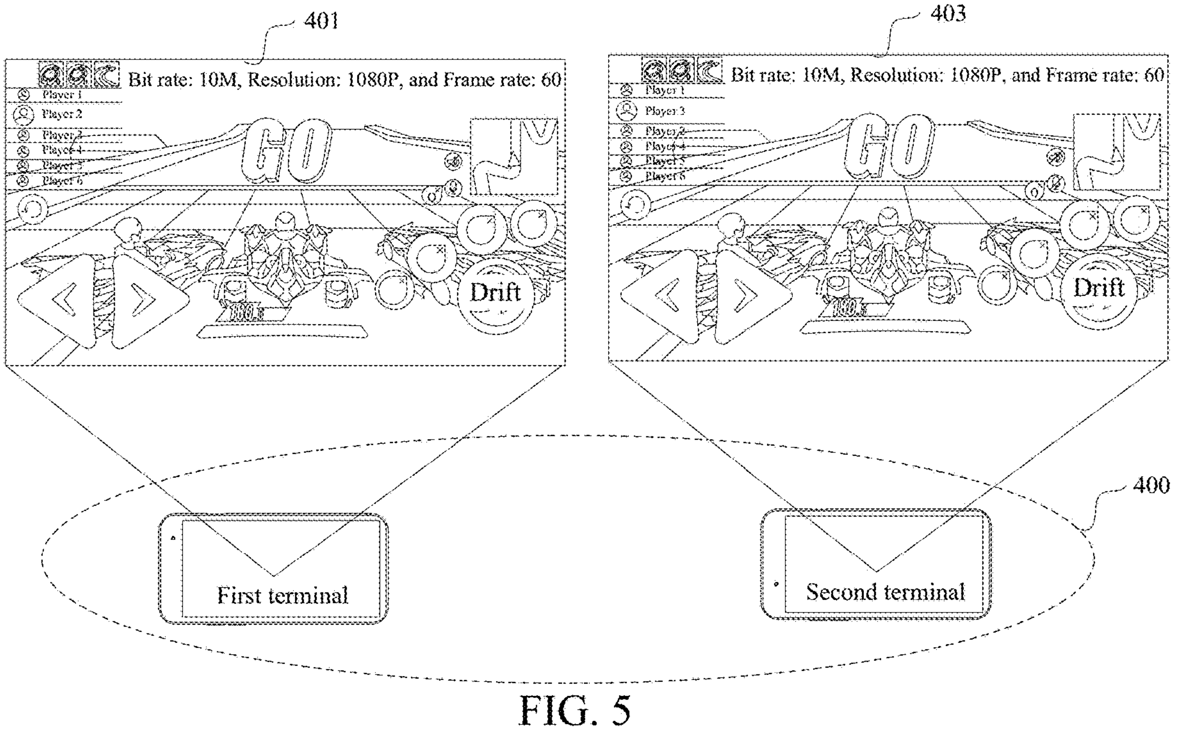
FIG. 5 is a schematic diagram of interfaces of changed video streams displayed by the terminals in the embodiment shown in FIG. 4.

Further, if the media-stream processing capability of the second terminal is enhanced, for example, the second terminal releases a running internal memory or shuts down a background application, as shown in FIG. 5, the server detects that the media-stream processing capabilities of the second terminal and the first terminal are the same, the second terminal may also obtain, from the server, a video stream with a higher bit rate, a higher resolution, and a higher frame rate for display. Specifically, the second terminal may display a battle picture 403 with a bit rate of 10 Mb/s, a resolution of 1080P, and a frame rate of 60 frames per second.

In the foregoing method for processing a media stream, adaptive encoding is performed on the to-be-delivered media data based on the media-stream processing capability information of the terminals joining the interaction room of the cloud application for interaction, to obtain the at least one type of media stream whose media-stream parameter matches the media-stream processing capability information. The to-be-delivered media stream selected based on the media-stream processing capability information of the subset of the terminals is determined from the at least one type of media stream, and the to-be-delivered media stream is delivered to the subset of the terminals, so that the subset of the terminals interacting based on the cloud application can obtain, based on the media-stream processing capability information of the subset of the terminals, the to-be-delivered media stream matching the subset of the terminals, and play the to-be-delivered media stream. Therefore, playing smoothness and playing quality of the media stream in the terminal can be effectively balanced, so that a playing effect of the media stream is improved.

Figure 6:
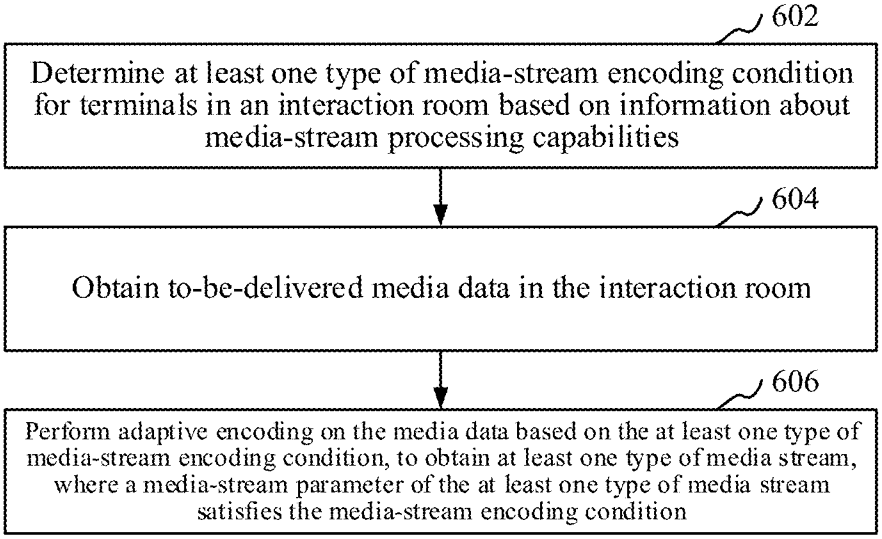
FIG. 6 is a schematic flowchart of adaptive encoding according to an embodiment.

In an embodiment, as shown in FIG. 6, processing of the adaptive encoding, to be specific, the performing adaptive encoding on to-be-delivered media data in the interaction room based on the media-stream processing capability information, to obtain at least one type of media stream for the terminals in the interaction room includes the following operations.

Operation 602: Determine at least one type of media-stream encoding condition for the terminals in the interaction room based on the media-stream processing capability information.

The media-stream encoding condition refers to a condition for encoding the media data, and may specifically include, but is not limited to, an encoding format, a bit rate, a resolution, a frame rate, and the like. The media data is encoded based on different media-stream encoding conditions, so that different types of media streams can be obtained. A media-stream parameter of each type of media stream satisfies a corresponding media-stream encoding condition. The media-stream encoding condition may be determined based on the media-stream processing capability information of all the terminals in the interaction room, so that a quantity of media streams can be reduced on the premise that playing effects of the media streams are ensured, thereby reducing a workload of encoding processing.

Specifically, the server determines the media-stream encoding condition for the terminals in the interaction room based on the media-stream processing capability information of all the terminals in the interaction room. There may be one type or at least two types of media-stream encoding conditions. Specifically, the media-stream encoding condition is determined based on the media-stream processing capability information of the terminals in the interaction room. For example, five terminals join an interaction room 3. The server may obtain information about a media-stream processing capability of each of the five terminals, and determine three types of media-stream encoding conditions based on the information about the media-stream processing capability of each of the terminals. For example, a terminal A, a terminal B, and a terminal C correspond to a media-stream encoding condition 1, a terminal D corresponds to a media-stream encoding condition 2, and a terminal E corresponds to a media-stream encoding condition 3.

In addition, during specific implementation, the server may alternatively determine, based on information about a media-stream processing capability of each terminal in the interaction room, a media-stream encoding condition corresponding to the terminal, to obtain the at least one type of media-stream encoding condition. For example, a terminal A and a terminal B join an interaction room 4. The server may respectively determine, based on information about a media-stream processing capability of each of the terminal A and the terminal B, media-stream encoding conditions respectively corresponding to the terminal A and the terminal B. In other words, in the interaction room 4, two types of media streams may be obtained through encoding based on the two types of media-stream encoding conditions. If a terminal F further joins the interaction room 4, and a media-stream encoding condition determined by the server based on information about a media-stream processing capability of the terminal F is the same as the media-stream encoding condition of the terminal A, the terminal F may also match encoding performed based on the media-stream encoding condition of the terminal A, to obtain a corresponding media stream. In this case, the media stream corresponding to the terminal A may be reused for the terminal F. In this case, in the interaction room 4, the two types of media streams are still obtained through encoding based on the two types of media-stream encoding conditions. If a terminal G further joins the interaction room 4, and a new media-stream encoding condition determined by the server based on information about a media-stream processing capability of the terminal G is different from all the respective media-stream encoding conditions of the terminal A, the terminal B, and the terminal F, the server may obtain, through encoding, a new media stream based on the new media-stream encoding condition. In this case, in the interaction room 4, the three types of media streams may be obtained through encoding based on the three types of media-stream encoding conditions.

Operation 604: Obtain the to-be-delivered media data in the interaction room.

The media data is application data generated in an interaction process of a terminal user in the cloud application, and needs to be delivered by the server to the terminal joining the interaction room for playing and displaying. Specifically, the server obtains the to-be-delivered media data in the interaction room. The media data may be generated through rendering by the server based on interaction-operation data uploaded by the terminals in the interaction room, and for example, may be video data of a cloud game.

Operation 606: Perform adaptive encoding on the media data based on the at least one type of media-stream encoding condition, to obtain the at least one type of media stream, where the media-stream parameter of the at least one type of media stream satisfies the media-stream encoding condition.

Specifically, the server performs adaptive encoding on the media data based on the at least one type of media-stream encoding condition. For example, the server may perform adaptive encoding on the media data based on a bit rate and an encoding format specified in the media-stream encoding condition, to obtain the at least one type of media stream. The media-stream parameter of the obtained at least one type of media stream satisfies the media-stream encoding condition. For example, when the media-stream encoding condition includes three bit rates: 3M, 5M, and 10M, the server may perform adaptive encoding on the media data, to obtain, through encoding, three types of media streams whose bit rates are respectively 3M, 5M, and 10M.

In this embodiment, the server determines the at least one type of media-stream encoding condition based on the media-stream processing capability information of the terminals in the interaction room, and performs adaptive encoding on the obtained media data based on the at least one type of media-stream encoding condition, to obtain the at least one type of media stream. The media-stream parameter of the media stream satisfies the media-stream encoding condition. Therefore, the matching media stream is obtained through encoding based on the media-stream processing capability information of the terminals in the interaction room, so that the subset of the terminals interacting based on the cloud application can obtain, based on the media-stream processing capability information of the subset of the terminals, the to-be-delivered media stream matching the subset of the terminals, and play the to-be-delivered media stream. Therefore, playing smoothness and playing quality of the media stream in the terminal can be effectively balanced, so that a playing effect of the media stream is improved.

In an embodiment, the media-stream processing capability information includes network resource information and device decoding information. The determining at least one type of media-stream encoding condition for the terminals in the interaction room based on the media-stream processing capability information includes: determining a bit rate based on the network resource information; determining an encoding format, a frame rate, and a resolution based on the device decoding information; and determining the at least one type of media-stream encoding condition for the terminals in the interaction room based on the bit rate, the encoding format, the frame rate, and the resolution.

The network resource information is configured for representing a network condition of the terminal, and may specifically include, but is not limited to, include a network bandwidth of the terminal, for example, may include an uplink bandwidth and a downlink bandwidth. The device decoding information is configured for representing a processing capability of decoding and playing the media stream by the terminal. The device decoding information may specifically include information about a decoding computing power of a device. For example, the device decoding information may include a decoding format, a resolution, a frame rate, and the like supported by the device. The encoding format refers to an encoding manner for encoding the media data, and may include, for example, an encoding manner such as H.264, VP9, H.265, or AV1. The decoding format corresponds to the encoding format. The media stream obtained through encoding based on the encoding format may be decoded based on the corresponding decoding format, to restore the media data.

Specifically, the information that is obtained by the server and that is about the media-stream processing capability includes the network resource information and the device decoding information of the terminal. The network resource information may be obtained by the server by performing bandwidth evaluation on the terminal. The device decoding information may be obtained by the server by querying attribute information of the device, or may be obtained through reporting by the terminal. For the network resource information, the server determines the bit rate, to be specific, determines a data transmission rate of a media stream that needs to be generated through encoding. For the device decoding information, the server may determine the encoding format, the frame rate, and the resolution, to ensure that the terminal can adapt to decoding to obtain the media data, and play the media data. The server obtains the at least one type of media-stream encoding condition for the terminals in the interaction room based on the bit rate, the encoding format, the frame rate, and the resolution.

During specific application, the server may determine the bit rate based on network resource information of a same terminal, determine the encoding format, the frame rate, and the resolution based on device decoding information of the terminal, and combine the bit rate, the encoding format, the frame rate, and the resolution, to obtain a media-stream encoding condition for the terminal. Further, after determining media-stream encoding conditions of the terminals, the server performs combination and deduplication based on the media-stream encoding conditions of the terminals, to obtain the at least one type of media-stream encoding condition for the terminals in the interaction room.

In this embodiment, the server determines the at least one type of media-stream encoding condition based on the bit rate determined based on the network resource information and the encoding format, the frame rate, and the resolution that are determined based on the device decoding information. Based on the determined media-stream encoding condition, the server can obtain, through encoding, the media stream matching the media-stream processing capability information of the terminals in the interaction room, so that the subset of the terminals interacting based on the cloud application can obtain, based on the media-stream processing capability information of the subset of the terminals, the to-be-delivered media stream matching the subset of the terminals, and play the to-be-delivered media stream. Therefore, playing smoothness and playing quality of the media stream in the terminal can be effectively balanced, so that a playing effect of the media stream is improved.

In an embodiment, the media-stream processing capability information includes the network resource information and the device decoding information, and the at least one type of media-stream encoding condition includes at least one of the encoding format, the bit rate, the frame rate, or the resolution.

Specifically, the information about the media-stream processing capability of the terminal includes the network resource information and the device decoding information. The network resource information is configured for representing a network status of the terminal, and the bit rate for the encoding can be determined based on the network status of the terminal. The device decoding information is configured for representing decoding and playing capabilities of the terminal for the media stream, and the encoding format, the frame rate, and the resolution for the encoding can be determined based on the decoding and playing capabilities of the terminal for the media stream. The media-stream encoding condition determined by the server includes at least one of the encoding format, the bit rate, the frame rate, or the resolution. Specifically, the media-stream encoding condition may be flexibly set based on an actual need.

In this embodiment, the server determines the at least one type of media-stream encoding condition based on at least one of the bit rate, the encoding format, the frame rate, and the resolution. Based on the determined media-stream encoding condition, the server can flexibly obtain, through encoding in a specified dimension, the media stream matching the media-stream processing capability information of the terminals in the interaction room, so that the subset of the terminals interacting based on the cloud application can obtain, based on the media-stream processing capability information of the subset of the terminals, the to-be-delivered media stream matching the subset of the terminals, and play the to-be-delivered media stream. Therefore, playing smoothness and playing quality of the media stream in the terminal can be effectively balanced, so that a playing effect of the media stream is improved.

In an embodiment, at least two types of media streams are included. The performing adaptive encoding on the media data based on the at least one type of media-stream encoding condition, to obtain the at least one type of media stream includes: when the media-stream encoding condition includes a same frame rate, respectively performing adaptive encoding on the media data, to obtain the at least two types of media streams, where media-stream parameters of the at least two types of media streams satisfy the media-stream encoding condition, and data at a same distribution location in the media streams has same timestamp information.

At least two types of media streams are included. To be specific, the server obtains, through encoding, at least two types of media streams with different media-stream parameters. The distribution location refers to a data location in the media stream. For example, for video data, the distribution location is indicated by a sequence number of a video frame in a video stream. The timestamp information refers to attribute information of the media data. Each piece of media data has respective attribute information, including respective timestamp information, to mark a sequence relationship between the media data. Encoding the media data refers to compressing the media data, that is, performing sampling compression. In this case, timestamps of media data obtained through sampling do not necessarily remain continuous. For example, for video data, if sampling encoding is performed at an interval of one frame, an interval of one frame also exists between timestamp information of video frames in a video stream obtained through encoding. The timestamp information may be specifically a timestamp sequence number, and is configured for representing a sequence relationship between data.

When a plurality of media streams are obtained through encoding, an association relationship between timestamp information of data in the media streams matches an association relationship between frame rates of the media streams. Specifically, when the server needs to obtain a plurality of types of media streams through encoding, and the media-stream encoding condition includes the same frame rate, that is, frame rates of the media streams are the same, the server respectively performs adaptive encoding on the media data based on the media-stream encoding condition, to obtain the at least two types of media streams. The obtained at least two types of media streams have different media-stream parameters, but have the same frame rate. For the obtained at least two types of media streams, the data at the same distribution location in the media streams has the same timestamp information. In other words, all the media streams are obtained by extracting the data with the same timestamp information from the original media data and encoding the data.

In this embodiment, when the server obtains the at least two types of media streams through encoding, when the media streams have the same frame rate, the timestamp information of the data in the media streams also remains consistent, to facilitate fast switching between different frame rates.

In an embodiment, at least two types of media streams are included. The performing adaptive encoding on the media data based on the at least one type of media-stream encoding condition, to obtain the at least one type of media stream includes: when the media-stream encoding condition includes that frame rates have a multiple relationship, respectively performing adaptive encoding on the media data, to obtain the at least two types of media streams, where media-stream parameters of the at least two types of media streams satisfy the media-stream encoding condition, and timestamp information of data at a same distribution location in the media streams has the multiple relationship.

At least two types of media streams are included. To be specific, the server obtains, through encoding, at least two types of media streams with different media-stream parameters. The distribution location refers to a data location in the media stream. For example, for video data, the distribution location is indicated by a sequence number of a video frame in a video stream. The multiple relationship refers to that magnification exists between different frame rates. For example, for a frame rate of 30 frames per second (FPS) and a frame rate of 60 FPS, a multiple relationship of double magnification exists between the two types of frame rates.

When the server needs to obtain a plurality of types of media streams through encoding, and the media-stream encoding condition includes that the frame rates have the multiple relationship, that is, frame rates of the different types of media streams have the multiple relationship, the server respectively performs adaptive encoding on the media data based on the media-stream encoding condition, to obtain the at least two types of media streams. The obtained at least two types of media streams have different media-stream parameters, and the frame rates also have multiple relationships. For the obtained at least two types of media streams, the timestamp information of the data at the same distribution location in the media streams also has a multiple relationship the same as the multiple relationship between the frame rates. In other words, all the media streams are obtained by extracting the data with the timestamp information having the multiple relationship from the original media data and encoding the data. For example, for media streams with two frame rates, a frame rate of a media stream A is 30 FPS, a frame rate of a media stream B is 60 FPS, and the frame rate of the media stream B is twice the frame rate of the media stream A. If a timestamp of an $n^{th}$ frame in the media stream A is 2N, a timestamp of an $n^{th}$ frame in the media stream B is N, and a timestamp of a $(2n)^{th}$ frame in the media stream B is 2N.

In this embodiment, when the server obtains the at least two types of media streams through encoding, when the frame rates of the media streams have the multiple relationship, the timestamp information of the data in the media streams also remains the consistent multiple relationship, to facilitate fast switching between different frame rates.

In an embodiment, the determining at least one type of media-stream encoding condition for the terminals in the interaction room based on the media-stream processing capability information includes: determining the at least one type of media-stream encoding condition for the terminals in the interaction room by using a simulcast algorithm based on the media-stream processing capability information. The performing adaptive encoding on the media data based on the at least one type of media-stream encoding condition, to obtain the at least one type of media stream includes: performing adaptive encoding on the media data by using an encoder matching each media-stream encoding condition, to obtain the at least one type of media stream.

In the simulcast algorithm, collected media data is encoded into a plurality of types of media streams during streaming by a streaming end, and the plurality of types of media streams are transmitted to a forwarding node. A terminal may be connected to the forwarding node, to dynamically select a media stream based on a network status of a downlink bandwidth of the terminal. Specifically, in the simulcast algorithm, different encoders are arranged to encode the media data, and different types of media streams are obtained through encoding by the different encoders.

Specifically, the server determines the at least one type of media-stream encoding condition by using the simulcast algorithm based on the media-stream processing capability information of the terminals in the interaction room. A quantity of types of the media-stream encoding conditions and a specific condition parameter of each media-stream encoding condition may be determined by using the simulcast algorithm based on the media-stream processing capability information. The server determines the encoder matching each media-stream encoding condition, and performs adaptive encoding on the media data by using the encoder, to obtain the at least one type of media stream whose media-stream parameter satisfies the media-stream encoding condition.

In this embodiment, the server determines the media-stream encoding condition by using the simulcast algorithm, and performs adaptive encoding on the media data by using the encoder matching each media-stream encoding condition, to obtain the at least one type of media stream. The media stream matching the media-stream processing capability information of the terminals in the interaction room is obtained through encoding, so that the subset of the terminals interacting based on the cloud application can obtain, based on the media-stream processing capability information of the subset of the terminals, the to-be-delivered media stream matching the subset of the terminals, and play the to-be-delivered media stream. Therefore, playing smoothness and playing quality of the media stream in the terminal can be effectively balanced, so that a playing effect of the media stream is improved.

In an embodiment, at least two types of media streams are included. The performing adaptive encoding on the media data based on the at least one type of media-stream encoding condition, to obtain the at least one type of media stream includes: determining a reference encoding optimization parameter of a reference media stream, where the reference media stream is obtained by performing adaptive encoding on the media data based on a reference media-stream encoding condition; determining, based on the reference encoding optimization parameter, an encoding optimization parameter matching the at least one type of media-stream encoding condition; and performing adaptive encoding on the media data based on the at least one type of media-stream encoding condition and the matching encoding optimization parameter, to obtain the at least one type of media stream.

At least two types of media streams obtained through adaptive encoding are included. The reference media stream is a media stream for reference of the adaptive encoding. The reference encoding optimization parameter is an optimization parameter of the reference media stream during encoding, and may specifically include various types of information such as information about rate distortion optimization, division of encoding units, transformation processing, and preprocessing, so that a distortion rate during the adaptive encoding can be effectively reduced. The reference media stream is obtained by performing adaptive encoding on the media data based on the reference media-stream encoding condition. Specifically, during the adaptive encoding, the reference encoding optimization parameter is introduced for encoding optimization processing.

Specifically, when the plurality of types of media streams are obtained through adaptive encoding, the server may determine a media stream that has been encoded or whose encoding parameter has been determined. In other words, the server may determine the reference media stream obtained by performing adaptive encoding on the media data based on the reference media-stream encoding condition, and obtain the reference encoding optimization parameter of the reference media stream. The server determines, based on the reference encoding optimization parameter, the encoding optimization parameter matching the at least one type of media-stream encoding condition, and performs adaptive encoding on the media data based on the at least one type of media-stream encoding condition and the matching encoding optimization parameter, to obtain the at least one type of media stream whose media-stream parameter satisfies the media-stream encoding condition. In this way, adaptive encoding is performed with assistance of the reference encoding optimization parameter of the reference media stream, so that processing of determining the encoding optimization parameter is simplified on the premise that a distortion rate of encoding of the media stream is reduced, to help improve processing efficiency of the adaptive encoding.

In this embodiment, the server determines, based on the reference encoding optimization parameter of the reference media stream, the encoding optimization parameter matching the at least one type of media-stream encoding condition, and assists the adaptive encoding based on the determined encoding optimization parameter. Therefore, the processing of determining the encoding optimization parameter is simplified on the premise that the distortion rate of encoding of the media stream is reduced, to help improve the processing efficiency of the adaptive encoding.

In an embodiment, the method for processing a media stream further includes: when the terminal joining the interaction room for interaction triggers an update, obtaining information about a media-stream processing capability of an updated terminal; and when the information about the media-stream processing capability of the updated terminal satisfies a media-stream update condition, updating the at least one type of media stream based on the information about the media-stream processing capability of the updated terminal.

When the terminal joining the interaction room of the cloud application for interaction triggers an update, it indicates that the terminal in the interaction room changes, for example, the terminal exits or a new terminal joins. The media-stream update condition is configured for determining whether media-stream information needs to be updated, to be specific, whether a quantity of media streams needs to be changed, or whether the media-stream parameter of each type of media stream needs to be changed. The media-stream update condition may be determined based on a matching result between the information about the media-stream processing capability of the updated terminal and the media-stream parameter of the existing media stream. If the information about the media-stream processing capability of the updated terminal can match the media-stream parameter of the existing media stream, the media stream that has been encoded may still be delivered to the updated terminal, and the media stream does not need to be updated. If the information about the media-stream processing capability of the updated terminal matches none of the media-stream parameter of the existing media stream, the media stream needs to be updated, to obtain a media stream whose media-stream parameter can match the information about the media-stream processing capability of the updated terminal. For example, a media stream may be newly added or a media-stream parameter of a part of the media stream may be changed.

Specifically, the server may perform detection on the terminal joining the interaction room. When it is detected that the terminal joining the interaction room for interaction triggers the update, for example, the update is triggered when the terminal exits the interaction room or a terminal joins the interaction room, the server may obtain the information about the media-stream processing capability of the updated terminal. The server obtains the media-stream update condition, and determines whether the information about the media-stream processing capability of the updated terminal satisfies the media-stream update condition. If the information about the media-stream processing capability of the updated terminal satisfies the media-stream update condition, it indicates that the media stream obtained through adaptive encoding needs to be updated. In this case, the server may update the at least one type of media stream based on the information about the media-stream processing capability of the updated terminal. For example, the server may add a new media stream, the server may reduce the media stream, or the server may adjust the media-stream parameter of the media stream. A manner in which the server updates the media stream is selected based on an actual need.

In this embodiment, when the terminal in the interaction room triggers the update, and the information about the media-stream processing capability of the updated terminal satisfies the media-stream update condition, the server updates the at least one type of media stream. Therefore, the media stream is dynamically updated based on a dynamic status of the terminal in the interaction room, so that the media stream can be dynamically adjusted in time when the update occurs in the interaction room, to balance playing smoothness and playing quality of the media stream in the terminal, and help improve a playing effect of the media stream.

In an embodiment, the performing adaptive encoding on to-be-delivered media data in the interaction room based on the media-stream processing capability information, to obtain at least one type of media stream for the terminals in the interaction room includes: performing adaptive encoding on the to-be-delivered media data in the interaction room based on the media-stream processing capability information and information about an encoding processing capability of the computer device, to obtain the at least one type of media stream for the terminals in the interaction room, where an entirety of the media-stream parameter of the at least one type of media stream matches the information about the encoding processing capability.

The information about the encoding processing capability is configured for describing the computer device, specifically describing a capability of performing encoding processing on the media data by the server for encoding, and may specifically include information about an encoding computing power of the server. If the encoding processing capability of the server is limited, and the server cannot support adaptive encoding processing of excessive media streams without limitation, the server may adjust and control the adaptive encoding of the media streams in combination with the information about the encoding processing capability.

Specifically, the server obtains the information about the encoding processing capability, and performs adaptive encoding on the to-be-delivered media data in the interaction room based on the information about the encoding processing capability and the media-stream processing capability information, to obtain the at least one type of media stream for the terminals in the interaction room. Specifically, the server may determine a quantity of media streams based on the media-stream processing capability information and the information about the encoding processing capability, and perform adaptive encoding based on the quantity, to obtain the corresponding quantity of media streams. The entirety of the media-stream parameter of the media stream obtained through adaptive encoding matches the information about the encoding processing capability. Specifically, the entirety of the media-stream parameter of the media stream does not exceed a range of the encoding processing capability of the server, to ensure that the server can normally perform adaptive encoding processing and output the corresponding quantity of media streams.

In this embodiment, the server performs adaptive encoding on the to-be-delivered media data in the interaction room based on the media-stream processing capability information and the information about the encoding processing capability, so that the entirety of the media-stream parameter of the obtained media stream matches the information about the encoding processing capability, to ensure that the server can normally perform adaptive encoding processing and output the corresponding quantity of media streams.

In an embodiment, the method for processing a media stream further includes: obtaining information about an operation instruction of the terminals joining the interaction room of the cloud application for interaction; and generating the to-be-delivered media data in the interaction room through rendering based on the information about the operation instruction, and storing the media data in a preset cache.

The information about the operation instruction refers to operation information of a control operation triggered when a user interacts in the interaction room of the cloud application. For example, in a battle interaction process of the cloud game, the information about the operation instruction may include operation information triggered by the user to perform a battle. Specifically, the user interacts in the interaction room by using the terminal, and the terminal collects the control operation triggered by the user, and generates the information about the operation instruction. The terminal transmits the information about the operation instruction to the server. The server obtains the information about the operation instruction uploaded by the terminal, and generates the to-be-delivered media data in the interaction room through rendering based on the information about the operation instruction. For example, the server may generate the to-be-delivered media data in the interaction room through rendering based on the information about the operation instruction and application interaction logic of the cloud application. The server may store the generated media data in the preset cache.

Further, the performing adaptive encoding on to-be-delivered media data in the interaction room based on the media-stream processing capability information, to obtain at least one type of media stream for the terminals in the interaction room includes: reading the media data from the preset cache, and performing adaptive encoding on the media data based on the media-stream processing capability information, to obtain the at least one type of media stream for the terminals in the interaction room.

Specifically, when performing adaptive encoding processing, the server may read the stored media data from the preset cache, and perform adaptive encoding on the obtained media data based on the media-stream processing capability information, to obtain the at least one type of media stream for the terminals in the interaction room.

In this embodiment, the server stores, in the preset cache, the media data generated through rendering based on the information about the operation instruction of the terminal, and reads the media data from the preset cache to perform adaptive encoding processing, so that repeated read/write processing on the media data in different memories can be reduced, to help improve processing efficiency of the adaptive coding on the media data.

In an embodiment, the obtaining media-stream processing capability information of terminals joining the interaction room for interaction includes: when it is detected that the terminals join, via a node server, the interaction room for interaction, performing network resource detection on the terminals, to obtain the network resource information; obtaining the device decoding information of the terminals; and obtaining the media-stream processing capability information of the terminals based on the network resource information and the device decoding information.

The node server may be separately connected to the server that processes media-stream data and the terminal, to serve as a connection bridge between the terminal and the server, thereby implementing stable communication between the terminal and the server. The terminal may be connected to the node server, to be connected, via the node server, to the server that processes the media-stream data. The network resource information of the terminal is obtained by the server by performing network resource detection. For example, bandwidth evaluation may be performed on the terminal to obtain the network resource information of the terminal.

Specifically, when detecting that the terminal joins, via the node server, the interaction room of the cloud application for interaction, the server may perform network resource detection on the terminal joining the interaction room, to obtain the network resource information of the terminal. The server may obtain the device decoding information of the terminal. Specifically, the server may obtain the device decoding information of the terminal by querying the attribute information of the terminal. The server obtains the media-stream processing capability information of the terminals based on the network resource information and the device decoding information of the terminals. In addition, after obtaining the network resource information of the terminal, the server may schedule access of the terminal based on the network resource information, and adjust the node server connected to the terminal, so that the terminal can access nearby, thereby reducing a network delay and a jitter.

In this embodiment, the server performs network resource detection on the terminals joining the interaction room via the node server, to obtain the network resource information, and obtains, in combination with the obtained device decoding information, the media-stream processing capability information of the terminals. Therefore, adaptive encoding can be performed based on the media-stream processing capability information of the terminals, so that the subset of the terminals interacting based on the cloud application can obtain, based on the media-stream processing capability information of the subset of the terminals, the to-be-delivered media stream matching the subset of the terminals, and play the to-be-delivered media stream. Therefore, playing smoothness and playing quality of the media stream in the terminal can be effectively balanced, so that a playing effect of the media stream is improved.

In an embodiment, the determining a to-be-delivered media stream matching a subset of the terminals in the interaction room includes at least one of the following: determining the to-be-delivered media stream from the at least one type of media stream based on a media-stream selection request transmitted by the subset of the terminals in the interaction room; or determining, from the at least one type of media stream, the to-be-delivered media stream whose media-stream parameter matches the media-stream processing capability information of the subset of the terminals in the interaction room.

The media-stream selection request may be transmitted by the subset of the terminals to the server, to request the server to deliver the specified to-be-delivered media stream. Specifically, the subset of the terminals may select the to-be-delivered media stream from the at least one type of media stream based on the real-time media-stream processing capability information of the subset of the terminals, and generate the media-stream selection request. The subset of the terminals transmits the media-stream selection request to the server, and the server determines, based on the media-stream selection request transmitted by the subset of the terminals, the to-be-delivered media stream selected by the subset of the terminals from the at least one type of media stream. In addition, the server may alternatively directly determine the to-be-delivered media stream of the subset of the terminals from the at least one type of media stream based on the media-stream processing capability information of the subset of the terminals.

In this embodiment, the server may determine the to-be-delivered media stream based on the media-stream selection request of the user, or directly determine the to-be-delivered media stream based on the media-stream processing capability information of the terminals, so that the adapted media stream can be accurately determined for the terminals, to ensure an effect of playing the media stream by the subset of the terminals.

Figure 7:
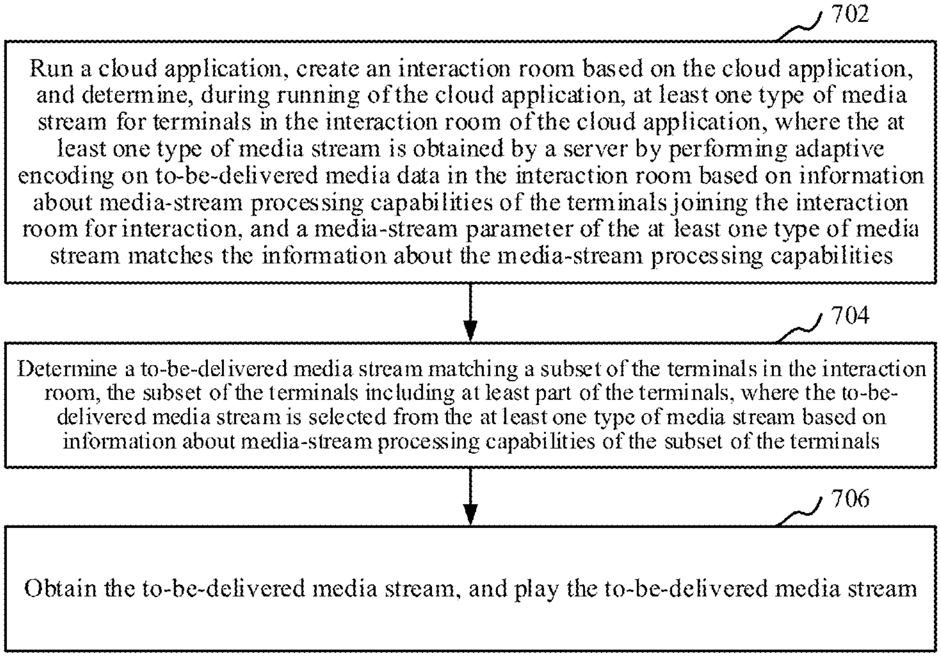
FIG. 7 is a schematic flowchart of a method for processing a media stream according to another embodiment.

In an embodiment, as shown in FIG. 7, a method for processing a media stream is provided. The method is performed by a computer device. Specifically, the method may be independently performed by a computer device such as a terminal or a server, or may be jointly performed by the terminal and the server. In this embodiment of the present disclosure, an example in which the method is applied to the terminal in FIG. 1 is used for description. The method includes the following operations.

Operation 702: Run a cloud application, create an interaction room based on the cloud application, and determine, during running of the cloud application, at least one type of media stream for terminals in the interaction room, where the at least one type of media stream is obtained by a server by performing adaptive encoding on to-be-delivered media data in the interaction room based on media-stream processing capability information of the terminals joining the interaction room for interaction, and a media-stream parameter of the at least one type of media stream matches the media-stream processing capability information.

The interaction room refers to virtual interaction space in the cloud application. Users belonging to a same interaction room may interact in the interaction room. In the interaction room, the users may implement various forms of interaction, such as a game battle and dialog communication. The information about the media-stream processing capability may be configured for describing a processing capability of the terminal for a media stream, and may be specifically a processing capability for a downlink media stream. For example, the information about the media-stream processing capability may include, but is not limited to, information about various capabilities such as a bit rate, a frame rate, and a decoding format supported by the terminal. Due to different device conditions of different devices, for example, a difference between hardware of the terminals or a difference between networks of the terminals, the different devices may have different media-stream processing capability information. The media data belongs to downlink data in the cloud application. To be specific, the media data is data that needs to be delivered to the terminals by the server. The media data is data generated during interaction performed by the user by using the cloud application, and specific data content and a data type are related to the cloud application. The adaptive encoding refers to adaptive encoding performed by the server for the information about the media-stream processing capability of the terminal in the interaction room. Different media-stream processing capability information may correspond to different encoding conditions, to obtain different media streams through encoding. The media stream is media encoding data obtained by the server by performing encoding on the media data. The media-stream parameter refers to an attribute parameter of the media stream, and may specifically include, but is not limited to, various attribute parameters including an encoding format, a resolution, a frame rate, a bit rate, and the like.

Specifically, after the cloud application is run and the interaction room is created based on the cloud application, for the subset of the terminals joining the interaction room of the cloud application for interaction, the at least one type of media stream generated by the server in the interaction room of the cloud application may be determined during running of the cloud application. The media-stream parameter of the at least one type of media stream matches the media-stream processing capability information. The at least one type of media stream is obtained by the server by performing adaptive encoding on the to-be-delivered media data in the interaction room based on the media-stream processing capability information of the terminals joining the interaction room for interaction.

Operation 704: Determine a to-be-delivered media stream matching a subset of the terminals in the interaction room, the subset of the terminals including at least part of the terminals, where the to-be-delivered media stream is selected from the at least one type of media stream based on media-stream processing capability information of the subset of the terminals.

The subset of the terminals may be at least a part of the terminals joining the interaction room of the cloud application for interaction. Specifically, the subset of the terminals may determine the to-be-delivered media stream matching the subset of the terminals in the interaction room, and the to-be-delivered media stream is selected from the at least one type of media stream based on the media-stream processing capability information of the subset of the terminals.

Operation 706: Obtain the to-be-delivered media stream, and play the to-be-delivered media stream.

Specifically, for the selected to-be-delivered media stream, the subset of the terminals obtain the to-be-delivered media stream, and play the obtained to-be-delivered media stream, for example, play an obtained target video stream.

In the foregoing method for processing a media stream, the at least one type of media stream for the terminals in the interaction room of the cloud application is determined. The at least one type of media stream is obtained by the server by performing adaptive encoding on the to-be-delivered media data in the interaction room based on the media-stream processing capability information of the terminals joining the interaction room for interaction, and the media-stream parameter of the at least one type of media stream matches the media-stream processing capability information. The to-be-delivered media stream selected based on the media-stream processing capability information of the subset of the terminals is determined from the at least one type of media stream, and the to-be-delivered media stream is obtained and played. The matching to-be-delivered media stream is obtained based on the media-stream processing capability information of the subset of the terminals in a process of interaction performed based on the cloud application, and is played. Therefore, playing smoothness and playing quality of the media stream in the terminal can be effectively balanced, so that a playing effect of the media stream is improved.

In an embodiment, the determining a to-be-delivered media stream matching a subset of the terminals in the interaction room includes: generating a media-stream selection request based on the media-stream processing capability information of the subset of the terminals; and transmitting the media-stream selection request to the server, where the media-stream selection request is configured for indicating the server to determine, from the at least one type of media stream, the to-be-delivered media stream matching the subset of the terminals.

The media-stream selection request may be transmitted by the subset of the terminals to the server, to request the server to deliver the specified to-be-delivered media stream. Specifically, the subset of the terminals may select the to-be-delivered media stream from the at least one type of media stream based on the real-time media-stream processing capability information of the subset of the terminals, and generate the media-stream selection request. The subset of the terminals transmits the media-stream selection request to the server, to indicate the server to determine, based on the media-stream selection request transmitted by the subset of the terminals, the to-be-delivered media stream selected by the subset of the terminals from the at least one type of media stream.

In this embodiment, the terminals may determine the to-be-delivered media stream by transmitting the media-stream selection request based on the media-stream processing capability information of the terminals, so that the adapted media stream can be accurately determined, to ensure an effect of playing the media stream by the subset of the terminals.

The present disclosure further provides an application scenario. The foregoing method for processing a media stream is applied to the application scenario. Specifically, application of the method for processing a media stream in the application scenario is as follows.

In an application scenario of a cloud conference, users may perform a video conference by using respective terminals based on a cloud-conferencing application. The terminals may collect local video data and upload the video data to a cloud server. The cloud server integrates the video data of the users to obtain conference video data of the cloud conference, and delivers the conference video data to the terminals. The terminals participating in the cloud conference has different performance and different media-stream processing capabilities. The cloud server may perform adaptive encoding on the to-be-delivered conference video data based on media-stream processing capability information of the terminals, to obtain at least one type of conference video stream whose video-stream parameter matches the media-stream processing capability information. The cloud server determines, from the at least one type of conference video stream, target conference video streams selected based on the information about the respective media-stream processing capabilities of the terminals, and delivers the target conference video streams to the corresponding terminals, to display the target conference video streams in the corresponding terminals. In the cloud conference, each terminal displays a conference video stream matching a media-stream processing capability of the terminal. Video stream parameters of the conference video stream may be different, for example, different frame rates, different bit rates, and different resolutions, but playing smoothness and playing quality of the conference video stream in the different terminals can be effectively balanced, thereby improving a playing effect of the conference video stream.

The present disclosure further provides an application scenario. The foregoing method for processing a media stream is applied to the application scenario. Specifically, application of the method for processing a media stream in the application scenario is as follows.

A basic principle of cloud application rendering is to put an application, for example, a game application, on a server for running. For an audio/video picture obtained through rendering by the application, a service program collects a desktop picture and voice, encodes audio/video, and transmits the audio/video to a terminal in a form of a media stream. Then, the terminal decodes a received audio/video stream, and renders the audio/video stream in the terminal. The application does not need to be installed in the terminal, and various terminals such as a television, a mobile phone, a personal computer (PC), and a tablet can run the application. An interactive cloud application, for example, an interactive cloud game, is run on a cloud rendering server. Then, a terminal user connects to an interaction room of the cloud rendering server to implement corresponding gameplay. For example, in a fighting game of The King of Fighters, for one application, a stand-alone device needs to be purchased. Interaction users connect to the device by using gamepads, to implement mutual play. Alternatively, two users with a PC version implement mutual play by using a same keyboard. However, for the interactive cloud application, an interaction user may connect to a cloud rendering device by using a television, a mobile phone, a PC, or a tablet in different places, to experience the interactive game application in real time. The cloud game is a gaming manner based on cloud computing. In a running mode of the cloud game, all games are run on a server side, and a rendered game picture is compressed and transmitted to a user via a network. A game device of the user on a client does not need any high-end processor and a graphics card, and needs only a basic video decompression capability to support the game.

For experience of an interactive cloud game application, in a conventional art, during code collection, a cloud rendering server selects, based on network bandwidths of all connected interaction users in a room, a lowest bandwidth bit rate for code transmission, to ensure downlink smoothness of the users in the entire room. Consequently, a biggest problem is that image quality of a user with a good network in the interaction room is poor. In other words, image quality of a game picture of the application in the interaction room is determined by a user with a poorest network in the interaction room, resulting in poor experience of the interaction users in the room. In addition, in the conventional art, for a downlink video encoded stream, only an encoding format supported by all downlink user terminals, such as H.264, VP9, H.265, or AV1, can be selected. When a video encoding format is configured, downlink video decoding formats of all the users need to be integrated. Consequently, a terminal that well supports hardware decoding of video from a network terminal can only select the video encoding format that all the participating terminals support decoding. In other words, only H.264 can be used by default basically, resulting in a problem of compressed image quality of the video stream and costs of a bandwidth waste.

Based on this, this embodiment provides a method for processing a media stream, and relates to a technical solution of rendering an application on an interactive cloud based on adaptive multi-bitrate streaming. Adaptive bitrate streaming (ABS) refers to adaptively selecting an adaptive downlink bit-rate stream based on a status of a downlink network bandwidth of a user. Specifically, an independent encoding computing-power service is added to a cloud rendering server. The encoding computing-power service may generate, through rendering in real time, a plurality of types of video streams with different bit rates, frame rates, and resolutions. A user in a rendering instance room can adaptively select a corresponding video stream based on a downlink network status of the user. Network bandwidths of different users in an interaction room and image quality of the video stream are compromised without increasing a delay, so that a playing effect of the video stream is enhanced, and user experience is improved.

Figure 8:
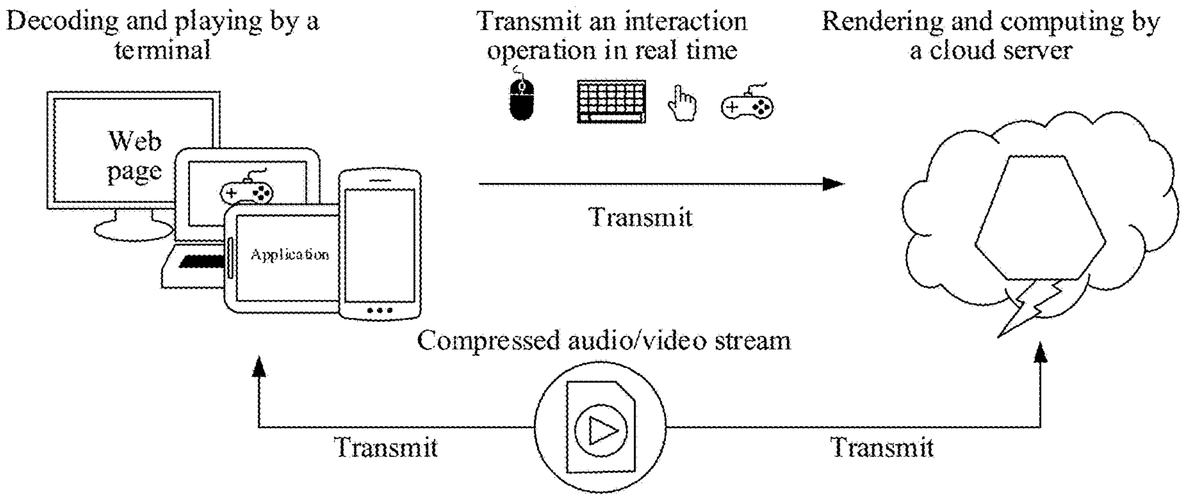
FIG. 8 is a schematic flowchart of cloud-game processing according to an embodiment.

Specifically, for a cloud application and a cloud game, a basic principle thereof is to put the game and the application on a server for running. For an audio/video picture obtained through rendering by the game and the application, a service program collects a desktop picture and voice, encodes audio/video, and transmits the audio/video to a terminal in a form of a media stream. Then, the terminal decodes a received audio/video stream, and renders the audio/video stream in the terminal. The game does not need to be installed in the terminal, and various terminals such as a television, a mobile phone, a PC, and a tablet can run the game. In this way, problems such as how the game and the application match different software and hardware platforms and whether rendering performance of the terminal is strong do not need to be focused. Uplink data may be operated by the terminal by using a keyboard, a mouse, a gamepad, a touchscreen, or the like. The terminal transmits an operation instruction and a coordinate position of a user uplink to a cloud game server. The cloud game server maps the received operation instruction into a corresponding game mouse button, and sends the game mouse button to a real game application server by using a keyboard and mouse driver, to complete service experience of the entire game application. As shown in FIG. 8, in a cloud game, a terminal transmits a collected interaction operation to a cloud server in real time. The cloud server performs rendering calculation, and delivers, to the terminal, a compressed audio/video stream obtained through the rendering calculation. The terminal decodes and plays the audio/video stream.

Figure 9:
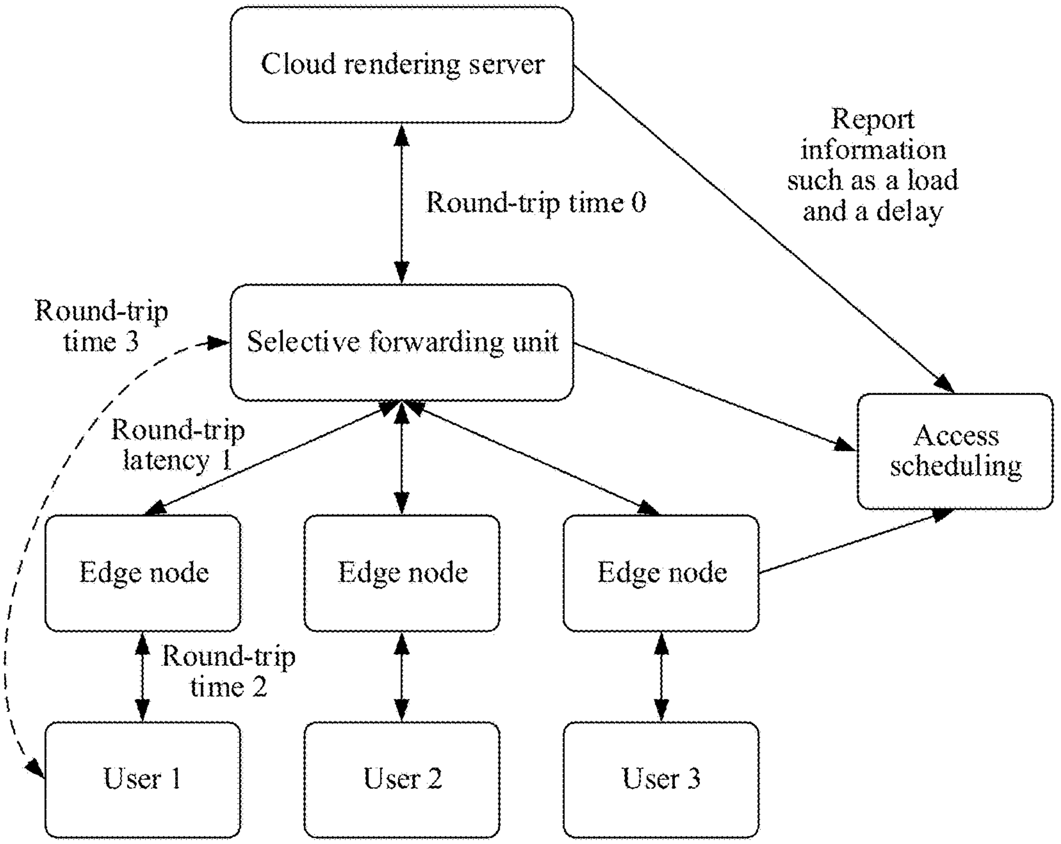
FIG. 9 is a block diagram of an architecture of a cloud game according to an embodiment.

A basic architecture of an interactive cloud application or cloud game is shown in FIG. 9. A user connects to an edge node or directly connects to a selective forwarding unit (SFU) for access. A cloud rendering server and an SFU server perform bandwidth estimation (BWE) on a network of the user, and perform nearby access scheduling based on home of the network of the user and the bandwidth estimation BWE, to minimize a delay. The selective forwarding unit SFU does not mix audio/video streams. After receiving an audio/video stream shared by a terminal, the SFU directly forwards the audio/video stream to another terminal in a room. The SFU is actually an audio/video routing forwarding device. A volume of a to-be-transmitted video stream can be determined through the bandwidth estimation, and no network congestion is caused, thereby ensuring that video quality is not reduced. The cloud rendering server may further report information such as a load and a delay to the access scheduling, to flexibly adjust the scheduling.

Further, during link selection, the edge node may be nearby scheduled, historical scheduling information may be referred to, or dynamic link switching may be performed. For round-trip time (RTT) of link connection, when the user connects to the selective forwarding unit via the edge node and then connects to the cloud rendering server, round-trip time RTT is round-trip time 0+ round-trip time 1+ round-trip time 2. When the user connects to the selective forwarding unit and then connects to the cloud rendering server, round-trip time RTT is the round-trip time 0+ the round-trip time 3. During conventional processing, the cloud rendering server collects and encodes a cloud rendered image in real time. For an encoding bit rate, a bandwidth of a user whose network is the worst in BWE is selected for bit-rate control of an encoding kernel based on bandwidth estimation BWE on networks of interaction users. Consequently, image quality in a room of the cloud rendering server is limited by the network bandwidth of the worst user in the room. For a downlink video encoded stream, only an encoding format supported by all downlink user terminals, such as H.264, VP9, H.265, or AV1, can be selected. When a video encoding format is configured, downlink video decoding formats of all the users need to be integrated. Consequently, a terminal that well supports hardware decoding of video from a network terminal can only select the video encoding format that all the participating terminals support decoding. In other words, only H.264 can be used by default, resulting in a problem of compressed image quality of the video stream and costs of a bandwidth waste.

An objective of the bit-rate control is to dynamically select a set of optimal encoding parameters for an encoder, to enable the encoder to generate, through encoding at a target bit rate, a bit stream satisfying a bandwidth requirement. A video bit rate is a quantity of bits of data transmitted per unit time during data transmission, and is generally in a unit of Kbps, that is, kilobit per second. The video bit rate may be understood as a sampling rate. A larger sampling rate per unit time indicates higher precision, and a processed file is closer to an original file. A higher bit rate indicates a clearer image. A frame rate is a definition in the image field, and refers to a quantity of frames transmitted per second in an image. The frame rate generally refers to a quantity of images in an animation or a video. Frames per second (FPS) is for measuring an amount of information configured for storing and displaying a dynamic video. A larger quantity of frames per second indicates a smoother displayed action.

Figure 10:
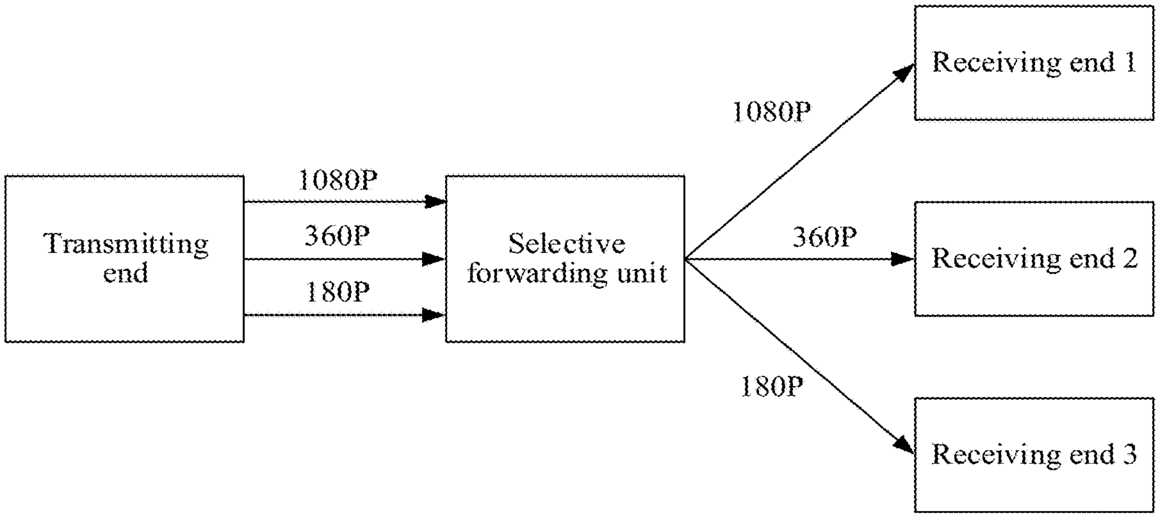
FIG. 10 is a schematic diagram of obtaining a plurality of video streams through encoding by using a simulcast technology according to an embodiment.

A basic principle of simulcast of web real-time communication (WebRTC) is as follows. The basic principle of the simulcast is that a collected original video stream is encoded into a plurality of types of video streams during streaming by a streaming end, and the plurality of types of video streams are transmitted to an SFU. A watching end may be connected to the SFU, to dynamically select a video stream based on a network status of a downlink bandwidth of the watching end. As shown in FIG. 10, a transmitting end may transmit video streams of three resolutions, including 1080P, 360P, and 180P, to a selective forwarding unit SFU. The selective forwarding unit SFU may correspondingly deliver the video streams based on needs of receiving ends. Specifically, the video stream of 1080P is delivered to a receiving end 1, the video stream of 360P is delivered to a receiving end 2, and the video stream of 180P is delivered to a receiving end 3. A most central feature of an SFU server is to "disguise" the SFU server as a Peer client of WebRTC. Another client of the WebRTC actually does not know whether the client is peer-to-peer connected to a real client or a server. This connection is generally referred to as peer to server (P2S), that is, Peer to Server (a point to a server).

During session description protocol (SDP) negotiation, a video media line of a simulcast interface displays a text of a=ssrc-group: SIM, and a format thereof is a=ssrc-group: SIM stream0 stream1 stream2 . . . , where a sequence length of a synchronization source (SSRC) sequence {stream0 stream1 stream2 . . . }, that is, a plurality of layers of simulcast, generally does not exceed 3. The layers are sequentially arranged in ascending order of resolutions. It is assumed that a resolution of a stream 0 is w0×h0, and so on. The resolution satisfies a condition that stream0 (w0×h0) <stream1 (w1×h1)<stream2 (w2×h2). An SSRC is a data source of a real-time transport protocol data stream (RTP stream), and a value of the SSRC is a random number in a fixed range.

For example, in a specific application, an example of simulcast SDP negotiation is as follows:

a=ssrc-group: SIM 3462331267 49866344//a is an attribute, and ssrc-group is configured for defining a group of associated ssrcs;

a=ssrc-group: FID 3462331267 1502500952//associate a group of normal RTP streams and a re-transmitted RTP stream a=ssrc-group: FID 49866344 241640858 a=ssrc: 3462331267 cname:m+kwZezC1JiVXDIB// cname is configured for defining a canonical name, and is configured for determining an RTP stream; cname below is the same;

a=ssrc: 49866344 cname: m+kwZezC1JiVXDIB a=ssrc: 1502500952 cname: m+kwZezC1JiVXDIB a=ssrc: 241640858 cname: m+kwZezC1JiVXDIB a=ssrc: 3462331267 cname: m+kwZezC1JiVXDIB a=simulcast: send 1;2,3 recv 4//two simulcast streams are transmitted in a send direction, where descriptions of one of the streams is in descriptions of rid=1, and descriptions of the other stream is in descriptions of rid=2 and rid=3; and one simulcast stream is received in a recv direction, where descriptions of the stream is in descriptions of rid=4;

A real-time control protocol (RTCP) provides each RTP user with a globally unique canonical name (CNAME) identifier, and a recipient uses the canonical name identifier to determine an RTP stream. a=ssrc-group: FID 3462331267 1502500952 is configured for associating a group of normal RTP streams and a re-transmitted RTP stream. a=ssrc-group: SIM 3462331267 49866344 refers to associating two groups of MediaStreamTrack whose encoding quality is in ascending order based on resolutions.

A configuration relationship of a change in a quantity of layers of simulcast may be as follows.

const SimulcastFormat kSimulcastFormats[ ]={
{1920, 1080, 3(a quantity of layers), 5000(a maximum bit rate), 4000(a start bit rate), 800(a minimum bit rate)},
{1280, 720, 3, 2500, 2500, 600},
{960, 540, 3, 1200, 1200, 350},
{640, 360, 2, 700, 500, 150},
{480, 270, 2, 450, 350, 150},
{320, 180, 1, 200, 150, 30},
{0, 0, 1, 200, 150, 30}};

During WebRTC, if a resolution of a collected video frame transmitted to an encoder changes, ReconfigureEncoder is triggered, in other words, an operation of the encoder is reset, and then the quantity of layers of simulcast is also recalculated. For a collection resolution of 1920×1080, a maximum allowed quantity of layers of simulcast is 3. For a collection resolution of 640×360, a maximum allowed quantity of layers is 2. Therefore, when the collection video resolution changes from 1920×1080 to 640×360, the quantity of layers of simulcast changes.

Figure 11:
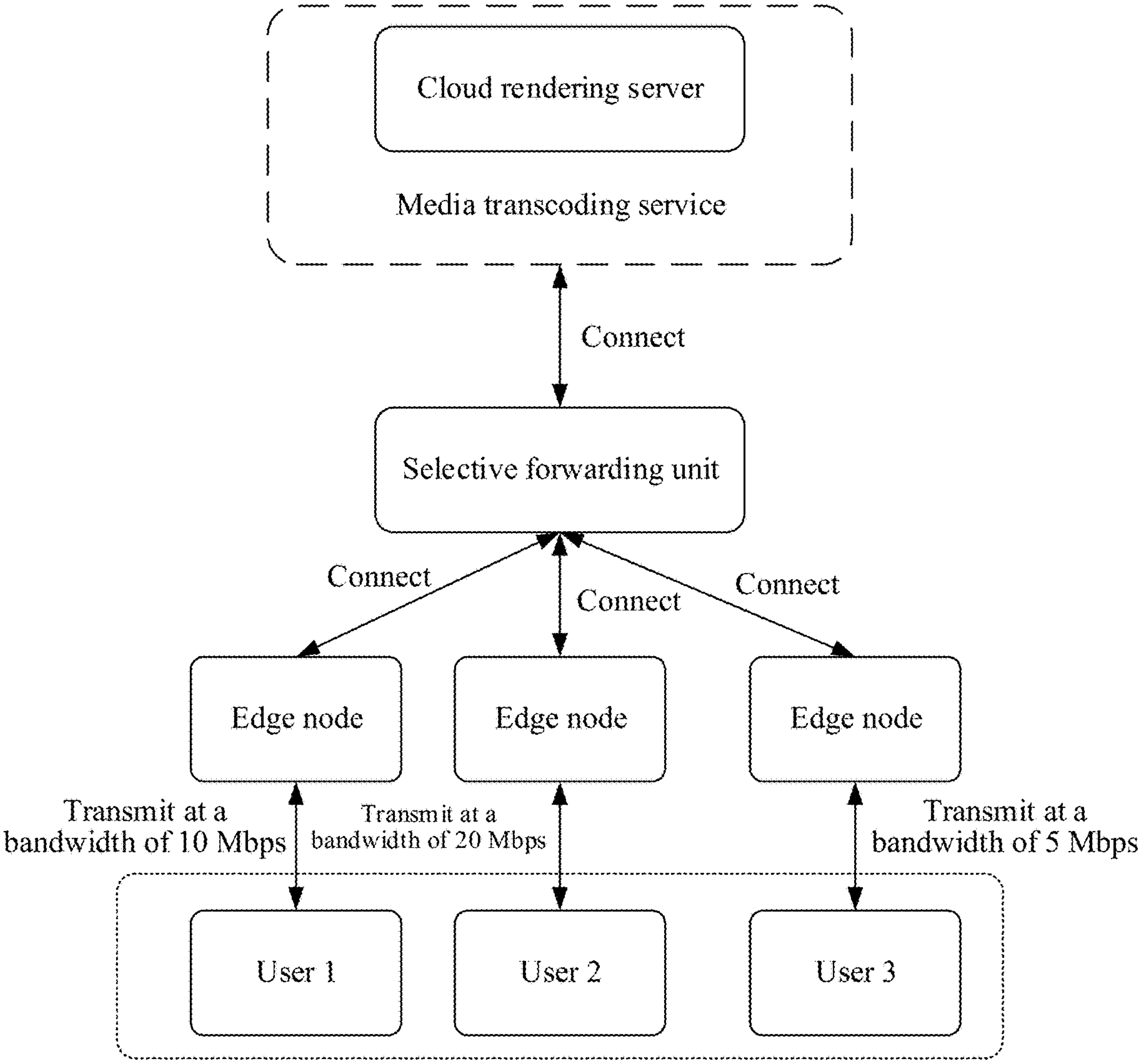
FIG. 11 is a block diagram of an architecture of media-stream processing according to an embodiment.

As shown in FIG. 11, in a basic architecture of the method for processing a media stream provided in this embodiment, a user connects to an edge node or directly connects to a selective forwarding unit SFU for access. A cloud rendering server and an SFU server perform bandwidth estimation BWE on a network of the user, and perform nearby access scheduling based on home of an Internet service provider (ISP) of the network of the user and the bandwidth estimation BWE, to minimize a delay. Specifically, scheduling may be arranged to a nearby operator based on an export IP of the user. For example, a user of Shenzhen telecommunication accesses nearby to a content delivery network (CDN) of Shenzhen telecommunication. When a nearby network is accessed, a network delay and jitter are minimized. A media transcoding service is added to the cloud rendering server. To reduce an end-to-end delay from the cloud rendering server to the user, the media transcoding service and the cloud rendering server may be disposed on instances with a same computing power and storage input/output (IO). An image buffer obtained through rendering by the cloud rendering server may include, for example, luminance, chrominance, and chroma (YUV) data or red, green, and blue (RGB) data of a video. The image buffer may be directly read by the media transcoding service by using a CPU or an internal memory IO, or may be directly accessed by using a peripheral such as a graphics processing unit (GPU), a field programmable gate array (FPGA), or an application-specific integrated circuit (ASIC) in a direct memory access (DMA) manner, thereby reducing repeated copy processing on the internal memory.

Specifically, a user 1, a user 2, and a user 3 each connect to a selective forwarding unit SFU via an edge node, and connect to a cloud rendering server. A bandwidth supported by the user 1 is 10 Mbps. To be specific, the user 1 supports media-stream transmission performed at 10 Mbps. A bandwidth supported by the user 2 is 20 Mbps. To be specific, the user 2 supports media-stream transmission performed at 20 Mbps. A bandwidth supported by the user 3 is 5 Mbps. To be specific, the user 3 supports media-stream transmission performed at 5 Mbps. On a cloud server side, video data rendered by the cloud rendering server may be directly accessed by a media transcoding service in a DMA manner. Specifically, a memory may be directly accessed by using a peripheral such as a CPU, a GPU, an ASIC, or a FPGA. The media transcoding service generates, through encoding by using a simulcast algorithm in an encoding manner of sharing information about rate distortion optimization (RDO), video streams of three bit rates: 5 Mbps, 10 Mbps, and 20 Mbps. Resolutions of the video streams are respectively 720P, 1080P, and 4K, and frame rates of the video streams are 30 FPS and 60 FPS. Many modes can be selected during encoding. In some modes, image distortion is small, but a bit rate is large. In some modes, image distortion is large, but a bit rate is small. An optimization process of rate distortion optimization is minimizing distortion when a maximum bit rate is not exceeded, and may be specifically implemented according to a method such as a conditional extremum or a Lagrange multiplier.

Further, the media transcoding service and a terminal user may have negotiation of media processing information, such as a video decoding format (VP9/H.264/H.265/AV1, or the like) supported by a user terminal, a simulcast multi-video stream bit rate, a resolution, and frame-rate negotiation. A plurality of different real-time video streams are obtained through encoding based on the negotiation, which may be specifically video streams with different bit rates, different resolutions, and different frame rates. When the plurality of real-time video streams are at different bit rates and different resolutions but a same frame rate, out-frame presentation time stamps (PTSs) remain consistent. If a multiple relationship is maintained between different frame rates, for example, 25 FPS corresponds to 50 FPS, 30 FPS corresponds to 60 FPS, and 60 FPS corresponds to 120 FPS, frame PTSs corresponding to the multiple relationship of different frame rates remain consistent. For example, an $N^{th}$ frame of a low frame rate corresponds to a $(2N)^{th}$ frame of a high frame rate. A size of a group of pictures (GOP) remains consistent, so that it is convenient for a user to seamlessly and quickly switch between video streams of different bit rates during simulcast. The GOP is a time interval between two I frames in video encoding.

Further, for negotiation of a video encoding algorithm, because a quantity of participating interaction users in an interaction application room of a cloud application or a cloud game dynamically changes, a quantity of channels of encoding started by the media transcoding service, an encoding algorithm format, and a bit rate may be dynamically adjusted and generated. For example, when there are only two people in an interaction room, a media processing transcoding service may generate one or two video streams through encoding. When a new user participates, whether a new channel of encoding needs to be dynamically added to match a quantity of users in the room is evaluated based on a supported video decoding format and a status of bandwidth evaluation BWE when the new user enters. A quantity of video encoded streams obtained through encoding by the media processing transcoding service in the room is obtained through negotiation between an encoding computing power of the cloud rendering server and the terminal user. A maximum quantity of instances of the media processing transcoding service cannot exceed a maximum processing capability of the encoding computing power of the cloud rendering server. Otherwise, frame outputting of collected code is unstable.

In addition, information about encoding RDO of different encoded video streams generated by the media processing transcoding service may be mutually referred. For example, different information about encoding RDO of the video streams, such as division of encoding units, motion compensation (MC), motion estimation (ME), transformation, preprocessing, or lookahead, may be mutually referred, to improve encoding efficiency and reduce consumption of the encoding computing power.

The terminal user negotiates with an SFU through standard WebRTC simulcast. A video stream that is suitable to a decoding computing power and a network bandwidth of a terminal of the terminal user is adaptively selected based on a media processing transcoding computing power of the cloud rendering server and based on a status of bandwidth evaluation BWE performed on a network of the user. Specifically, the server may adaptively encode different levels, resolutions, client encoding codec support statuses, and statuses of the computing power of the cloud server based on an average network status of users accessing the room, and generate, through encoding, several video streams with suitable bit rates, resolutions, and encoding and decoding formats. The terminal user selects access based on a current network status of the terminal user. For example, if the user network is 5M, the server may generate, through encoding, a 4.5 M video stream with 1080P @ 60 FPS. To be specific, a resolution is 1080P, a frame rate is 60 FPS, and a bit rate is 4.5 M. However, the computing power of the server is limited. Therefore, two or three video streams may be generated through encoding. For example, the cloud rendering server may generate, through encoding, three levels: H.264 1080P @ 25 FPS 2.5 M, H.265 1080P @ 60 FPS 5M, and H.264 720P @ 25 FPS 1M. A user in the room adaptively selects a suitable level based on a network status of the user, to obtain a corresponding video stream for playing.

In the method for processing a media stream provided in this embodiment, a suitable video bit-rate stream is adaptively selected for a terminal user in the interaction room based on a plurality of bit rates, so that quality of service (QOS) and quality of experience (QoE) of various applications are effectively improved.

Although the operations in the flowcharts involved in the foregoing embodiments are displayed sequentially as indicated by arrows, the operations are not necessarily performed sequentially as indicated by the arrows. Unless otherwise explicitly specified in this specification, a sequence of performing the operations is not strictly limited, and the operations may be performed in another sequence. In addition, at least a part of the operations in the flowcharts involved in the foregoing embodiments may include a plurality of operations or a plurality of stages. These operations or stages are not necessarily performed simultaneously, but may be performed at different moments. These operations or stages are not necessarily performed sequentially, but may be performed in turn or alternately with other operations or at least a part of operations or stages in the other operations.

Based on a same inventive concept, an embodiment of the present disclosure further provides an apparatus for processing a media stream, configured for implementing the foregoing method for processing a media stream. An implementation solution provided by the apparatus for resolving a problem is similar to the implementation solution recorded in the foregoing method. Therefore, for specific limitations on one or more following embodiments of the apparatus for processing a media stream, refer to the limitations on the foregoing method for processing a media stream. Details are not described herein again.

Figure 12:
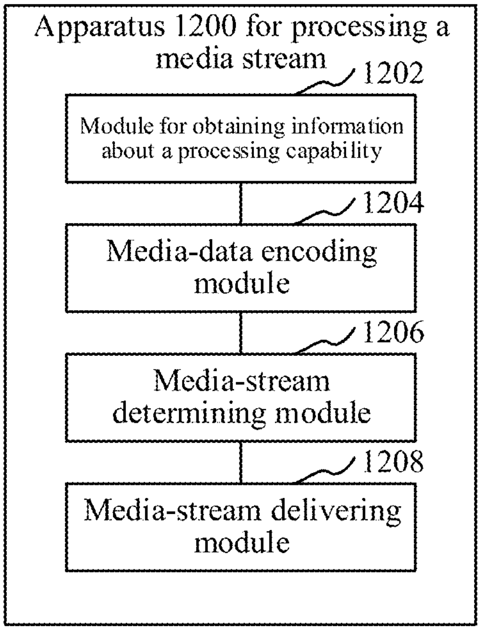
FIG. 12 is a block diagram of a structure of an apparatus for processing a media stream according to an embodiment.

In an embodiment, as shown in FIG. 12, an apparatus 1200 for processing a media stream is provided, including a module 1202 for obtaining information about a processing capability, a media-data encoding module 1204, a media-stream determining module 1206, and a media-stream delivering module 1208.

The module 1202 for obtaining information about a processing capability is configured to determine a cloud application and an interaction room created in the cloud application, and obtain, during running of the cloud application, media-stream processing capability information of terminals joining the interaction room for interaction.

The media-data encoding module 1204 is configured to perform adaptive encoding on to-be-delivered media data in the interaction room based on the media-stream processing capability information, to obtain at least one type of media stream for the terminals in the interaction room, a media-stream parameter of the at least one type of media stream matching the media-stream processing capability information.

The media-stream determining module 1206 is configured to determine a to-be-delivered media stream matching a subset of the terminals in the interaction room, the subset of the terminals including at least part of the terminals, the to-be-delivered media stream being selected from the at least one type of media stream based on media-stream processing capability information of the subset of the terminals.

The media-stream delivering module 1208 is configured to deliver the to-be-delivered media stream to the subset of the terminals in the interaction room.

In an embodiment, the media-data encoding module 1204 is further configured to determine at least one type of media-stream encoding condition for the terminals in the interaction room based on the media-stream processing capability information; obtain the to-be-delivered media data in the interaction room; and perform adaptive encoding on the media data based on the at least one type of media-stream encoding condition, to obtain the at least one type of media stream, where the media-stream parameter of the at least one type of media stream satisfies the media-stream encoding condition.

In an embodiment, the media-stream processing capability information includes network resource information and device decoding information. The media-data encoding module 1204 is further configured to determine a bit rate based on the network resource information; determine an encoding format, a frame rate, and a resolution based on the device decoding information; and determine the at least one type of media-stream encoding condition for the terminals in the interaction room based on the bit rate, the encoding format, the frame rate, and the resolution.

In an embodiment, the media-stream processing capability information includes the network resource information and the device decoding information, and the at least one type of media-stream encoding condition includes at least one of the encoding format, the bit rate, the frame rate, or the resolution.

In an embodiment, at least two types of media streams are included. The media-data encoding module 1204 is further configured to: when the media-stream encoding condition includes a same frame rate, respectively perform adaptive encoding on the media data, to obtain the at least two types of media streams, where media-stream parameters of the at least two types of media streams satisfy the media-stream encoding condition, and data at a same distribution location in the media streams has same timestamp information.

In an embodiment, at least two types of media streams are included. The media-data encoding module 1204 is further configured to: when the media-stream encoding condition includes that frame rates have a multiple relationship, respectively perform adaptive encoding on the media data, to obtain the at least two types of media streams, where media-stream parameters of the at least two types of media streams satisfy the media-stream encoding condition, and timestamp information of data at a same distribution location in the media streams has the multiple relationship.

In an embodiment, the media-data encoding module 1204 is further configured to determine the at least one type of media-stream encoding condition for the terminals in the interaction room by using a simulcast algorithm based on the media-stream processing capability information; and perform adaptive encoding on the media data by using an encoder matching each media-stream encoding condition, to obtain the at least one type of media stream.

In an embodiment, at least two types of media streams are included. The media-data encoding module 1204 is further configured to determine a reference encoding optimization parameter of a reference media stream, where the reference media stream is obtained by performing adaptive encoding on the media data based on a reference media-stream encoding condition; determine, based on the reference encoding optimization parameter, an encoding optimization parameter matching the at least one type of media-stream encoding condition; and perform adaptive encoding on the media data based on the at least one type of media-stream encoding condition and the matching encoding optimization parameter, to obtain the at least one type of media stream.

In an embodiment, a media-stream update module is further included, configured to: when the terminal joining the interaction room for interaction triggers an update, obtain information about a media-stream processing capability of an updated terminal; and when the information about the media-stream processing capability of the updated terminal satisfies a media-stream update condition, update the at least one type of media stream based on the information about the media-stream processing capability of the updated terminal.

In an embodiment, the media-data encoding module 1204 is further configured to perform adaptive encoding on the to-be-delivered media data in the interaction room based on the media-stream processing capability information and information about an encoding processing capability of the computer device, to obtain the at least one type of media stream for the terminals in the interaction room, where an entirety of the media-stream parameter of the at least one type of media stream matches the information about the encoding processing capability.

In an embodiment, a media-data generation module is further included, configured to obtain information about an operation instruction of the terminals joining the interaction room of the cloud application for interaction; and generate the to-be-delivered media data in the interaction room through rendering based on the information about the operation instruction, and store the media data in a preset cache. The media-data encoding module 1204 is further configured to read the media data from the preset cache, and perform adaptive encoding on the media data based on the media-stream processing capability information, to obtain the at least one type of media stream for the terminals in the interaction room.

In an embodiment, the module 1202 for obtaining information about a processing capability is further configured to: when it is detected that the terminals join, via a node server, the interaction room for interaction, perform network resource detection on the terminals, to obtain the network resource information; obtain the device decoding information of the terminals; and obtain the media-stream processing capability information of the terminals based on the network resource information and the device decoding information.

In an embodiment, the media-stream determining module 1206 is further configured to determine the to-be-delivered media stream from the at least one type of media stream based on a media-stream selection request transmitted by the subset of the terminals in the interaction room.

In an embodiment, the media-stream determining module 1206 is further configured to determine, from the at least one type of media stream, the to-be-delivered media stream whose media-stream parameter matches the media-stream processing capability information of the subset of the terminals in the interaction room.

All or a part of the modules in the foregoing apparatus for processing a media stream may be implemented by using software, hardware, or a combination thereof. The foregoing modules may be built in or independent of a processor in a computer device in a form of hardware, or may be stored in a memory in the computer device in a form of software, so that the processor invokes and executes the operations corresponding to the foregoing modules.

Figure 13:
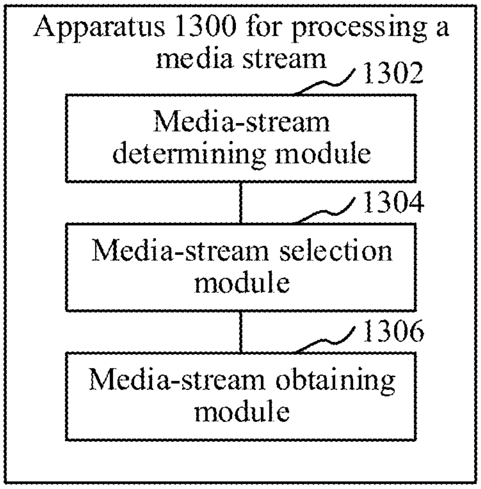
FIG. 13 is a block diagram of a structure of an apparatus for processing a media stream according to another embodiment.

In an embodiment, as shown in FIG. 13, an apparatus 1300 for processing a media stream is provided, including a media-stream determining module 1302, a media-stream selection module 1304, and a media-stream obtaining module 1306.

The media-stream determining module 1302 is configured to run a cloud application, create an interaction room based on the cloud application, and determine, during running of the cloud application, at least one type of media stream for terminals in the interaction room, the at least one type of media stream being obtained by a server by performing adaptive encoding on to-be-delivered media data in the interaction room based on media-stream processing capability information of the terminals joining the interaction room for interaction, and a media-stream parameter of the at least one type of media stream matching the media-stream processing capability information.

The media-stream selection module 1304 is configured to determine a to-be-delivered media stream matching a subset of the terminals in the interaction room, the subset of the terminals including at least part of the terminals, the to-be-delivered media stream being selected from the at least one type of media stream based on media-stream processing capability information of the subset of the terminals.

The media-stream obtaining module 1306 is configured to obtain the to-be-delivered media stream, and play the to-be-delivered media stream.

In an embodiment, the media-stream selection module 1304 is further configured to generate a media-stream selection request based on the media-stream processing capability information of the subset of the terminals; and transmit the media-stream selection request to the server, where the media-stream selection request is configured for indicating the server to determine, from the at least one type of media stream, the to-be-delivered media stream matching the subset of the terminals.

In an embodiment, a computer device is provided. The computer device may be a server, and an internal structure diagram thereof may be shown in FIG. 14. The computer device includes a processor, a memory, an input/output (I/O for short) interface, and a communication interface. The processor, the memory, and the input/output interface are connected through a system bus, and the communication interface is connected to the system bus through the input/output interface. The processor of the computer device is configured to provide computing and control capabilities. The memory of the computer device includes a non-transitory storage medium and an internal memory. The non-transitory storage medium has an operating system, computer-readable instructions, and a database stored therein. The internal memory provides an environment for running of the operating system and the computer-readable instructions in the non-transitory storage medium. The database of the computer device is configured to store media-stream processing data. The I/O interface of the computer device is configured to exchange information between the processor and an external device. The communication interface of the computer device is configured to connect and communicate with an external terminal via a network. The computer-readable instructions, when executed by the processor, implement a method for processing a media stream.

In an embodiment, a computer device is provided. The computer device may be a terminal, and an internal structure diagram thereof may be shown in FIG. 15. The computer device includes a processor, a memory, an input/output interface, a communication interface, a display unit, and an input apparatus. The processor, the memory, and the input/output interface are connected through a system bus, and the communication interface, the display unit, and the input apparatus are connected to the system bus through the input/output interface. The processor of the computer device is configured to provide computing and control capabilities. The memory of the computer device includes a non-transitory storage medium and an internal memory. The non-transitory storage medium has an operating system and computer-readable instructions stored therein. The internal memory provides an environment for running of the operating system and the computer-readable instructions in the non-transitory storage medium. The I/O interface of the computer device is configured to exchange information between the processor and an external device. The communication interface of the computer device is configured to communicate with an external terminal in a wired or wireless manner. The wireless manner may be implemented through Wi-Fi, a cellular mobile network, near field communication (NFC), or another technology. The computer-readable instructions, when executed by the processor, implement a method for processing a media stream. The display unit of the computer device is configured to form a visually visible picture, and may be a display screen, a projection apparatus, or a virtual reality imaging apparatus. The display screen may be a liquid crystal display screen or an e-ink display screen. The input apparatus of the computer device may be a touch layer covering the display screen, or may be a button, a trackball, or a touchpad disposed on a housing of the computer device, or may be an external keyboard, touchpad, mouse, or the like.

Figure 14:
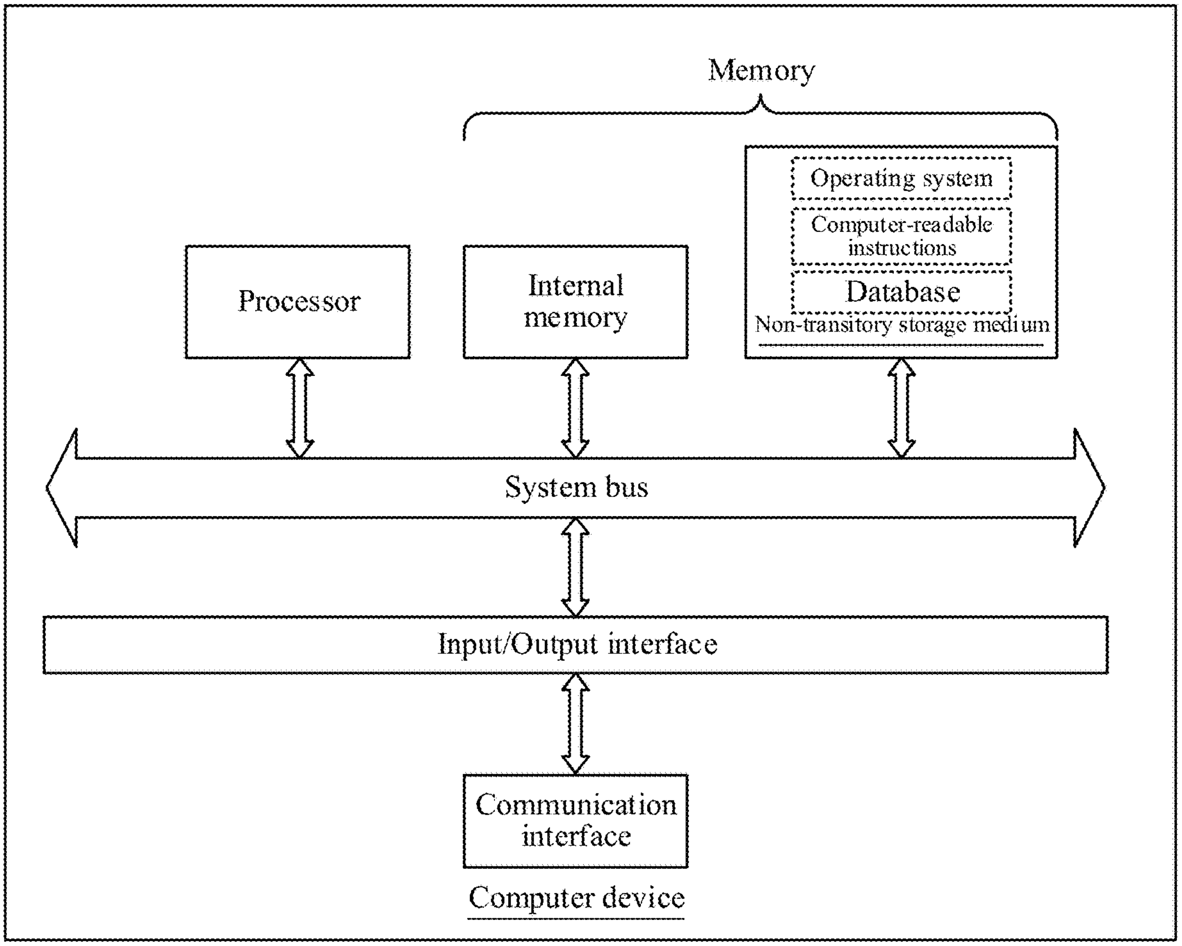
FIG. 14 is a diagram of an inner structure of a computer device according to an embodiment.
Figure 15:
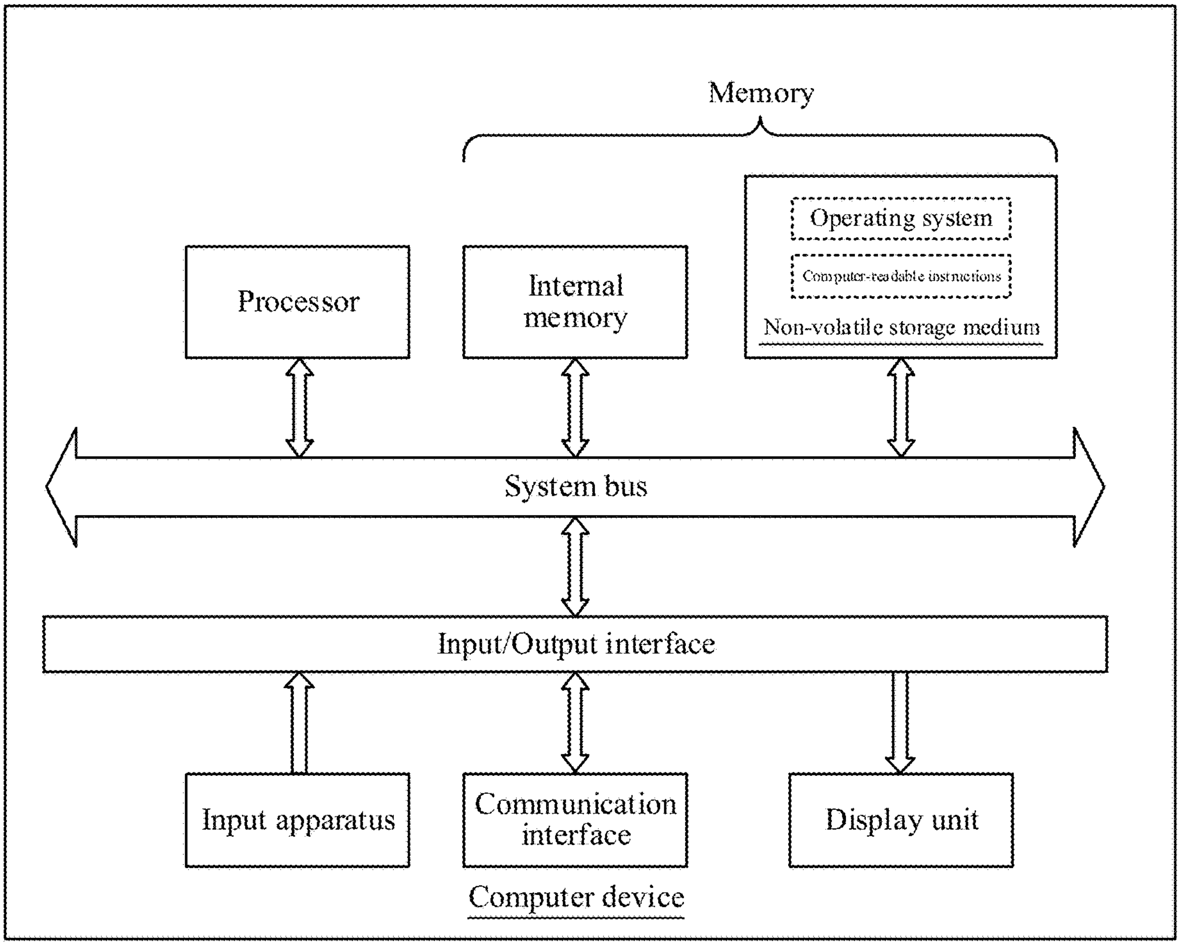
FIG. 15 is a diagram of an inner structure of a computer device according to another embodiment.

A person skilled in the art may understand that the structures shown in FIG. 14 and FIG. 15 are merely block diagrams of a part of structures related to the solutions of the present disclosure, but constitute no limitation on the computer device to which the solutions of the present disclosure are applied. A specific computer device may include more or fewer components than those shown in the figure, or some components are combined, or in different component arrangements.

In an embodiment, a computer device is further provided, including a memory and a processor. The memory has computer-readable instructions stored therein, and the processor implements the operations in the foregoing method embodiments when executing the computer-readable instructions.

In an embodiment, a computer-readable storage medium is provided, having computer-readable instructions stored therein. The computer-readable instructions, when executed by a processor, implements the operations in the foregoing method embodiments.

In an embodiment, a computer program product is provided, including computer-readable instructions. The computer-readable instructions, when executed by a processor, implements the operations in the foregoing method embodiments.

User information (including, but not limited to, information about user equipment, user personal information, and the like) and data (including, but not limited to, data for analysis, stored data, displayed data, and the like) involved in the present disclosure are all information and data authorized by a user or fully authorized by all parties, and collection, use, and processing of relevant data need to comply with relevant laws, regulations, and standards of relevant countries and regions.

A person of ordinary skill in the art may understand that all or some of the procedures in the methods in the foregoing embodiments may be implemented by computer-readable instructions instructing relevant hardware. The computer-readable instructions may be stored in a non-transitory computer-readable storage medium. When the computer-readable instructions are executed, the procedures of the foregoing method embodiments may be implemented. Any reference to the memory, the database, or another medium used in the embodiments provided in the present disclosure may include at least one of a non-transitory memory and a transitory memory. The non-transitory memory may include a read-only memory (ROM), a magnetic tape, a floppy disk, a flash memory, an optical memory, a high-density embedded non-volatile memory, a resistive random-access memory (ReRAM), a magnetoresistive random access memory (MRAM), a ferroelectric random access memory (FRAM), a phase change memory (PCM), a graphene memory, or the like. The transitory memory may include a random access memory (RAM) or an external cache. As an illustration rather than a limitation, the RAM may be in a plurality of forms, such as a static random access memory (SRAM) or a dynamic random access memory (DRAM). The database involved in the embodiments provided in the present disclosure may include at least one of a relational database and a non-relational database. The non-relational database may include a blockchain-based distributed database, or the like. This is not limited thereto. The processor involved in the embodiments provided in the present disclosure may be a general-purpose processor, a central processing unit, a graphics processor, a digital signal processor, a programmable logic device, a data processing logic device based on quantum computing, or the like. This is not limited thereto.

Technical features of the foregoing embodiments may be combined in different manners to form other embodiments. To make the descriptions simple, not all possible combinations of the technical features in the foregoing embodiments are described. However, provided that there is no conflict in the combinations of these technical features, the combinations are to be considered as falling within the scope recorded in this specification.

The foregoing embodiments show only several implementations of the present disclosure, and are described in detail, but are not to be construed as a limitation on the patent scope of the present disclosure. For a person of ordinary skill in the art, several variations and improvements may be made without departing from the idea of the present disclosure. These variations and improvements all fall within the protection scope of the present disclosure. Therefore, the protection scope of the present disclosure is subject to the claims.

What is claimed is:

1. A method for processing a media stream, performed by a computer device, the method comprising:

determining a cloud application and an interaction room created in the cloud application, and obtaining, during running of the cloud application, media-stream processing capability information of terminals joining the interaction room for interaction;

obtaining information about an operation instruction of the terminals joining the interaction room of the cloud application for interaction;

generating media data to be delivered to the interaction room through rendering based on the information about the operation instruction, and storing the media data in a cache;

reading the media data from the cache, and performing adaptive encoding on the media data to be delivered in the interaction room based on the media-stream processing capability information, to obtain at least one type of media stream for the terminals in the interaction room, a media-stream parameter of the at least one type of media stream matching the media-stream processing capability information;

determining a media stream to be delivered matching a subset of the terminals in the interaction room, the subset of the terminals comprising at least one of the terminals, the media stream being selected from the at least one type of media stream based on media-stream processing capability information of the subset of the terminals; and delivering the media stream to the subset of the terminals in the interaction room.

2. The method according to claim 1, wherein the performing adaptive encoding on media data to be delivered in the interaction room based on the media-stream processing capability information, to obtain at least one type of media stream for the terminals in the interaction room comprises:

determining at least one type of media-stream encoding condition for the terminals in the interaction room based on the media-stream processing capability information;

obtaining the media data in the interaction room; and performing adaptive encoding on the media data based on the at least one type of media-stream encoding condition, to obtain the at least one type of media stream, wherein the media-stream parameter of the at least one type of media stream satisfies the media-stream encoding condition.

3. The method according to claim 2, wherein the media-stream processing capability information comprises network resource information and device decoding information, and the determining at least one type of media-stream encoding condition for the terminals in the interaction room based on the media-stream processing capability information comprises:

determining a bit rate based on the network resource information;

determining an encoding format, a frame rate, and a resolution based on the device decoding information; and determining the at least one type of media-stream encoding condition for the terminals in the interaction room based on the bit rate, the encoding format, the frame rate, and the resolution.

4. The method according to claim 2, wherein the media-stream processing capability information comprises network resource information and device decoding information, and the at least one type of media-stream encoding condition comprises at least one of an encoding format, a bit rate, a frame rate, or a resolution.

5. The method according to claim 2, wherein the media stream obtained from the adaptive encoding comprises at least two types of media stream, and the performing adaptive encoding on the media data based on the at least one type of media-stream encoding condition, to obtain the at least one type of media stream comprises:

when the media-stream encoding condition comprises a same frame rate, respectively performing adaptive encoding on the media data, to obtain the at least two types of media streams, wherein media-stream parameters of the at least two types of media streams satisfy the media-stream encoding condition, and data at a same distribution location in the media streams has same timestamp information.

6. The method according to claim 2, wherein the media stream obtained from the adaptive encoding comprises at least two types of media stream, and the performing adaptive encoding on the media data based on the at least one type of media-stream encoding condition, to obtain the at least one type of media stream comprises:

when the media-stream encoding condition comprises that frame rates have a multiple relationship, respectively performing adaptive encoding on the media data, to obtain the at least two types of media streams, wherein media-stream parameters of the at least two types of media streams satisfy the media-stream encoding condition, and timestamp information of data at a same distribution location in the media streams has the multiple relationship.

7. The method according to claim 2, wherein the determining at least one type of media-stream encoding condition for the terminals in the interaction room based on the media-stream processing capability information comprises:

determining the at least one type of media-stream encoding condition for the terminals in the interaction room by using a simulcast algorithm based on the media-stream processing capability information; and the performing adaptive encoding on the media data based on the at least one type of media-stream encoding condition, to obtain the at least one type of media stream comprises:

performing adaptive encoding on the media data by using an encoder matching the media-stream encoding condition, to obtain the at least one type of media stream.

8. The method according to claim 2, wherein the media stream obtained from the adaptive encoding comprises at least two types of media stream, and the performing adaptive encoding on the media data based on the at least one type of media-stream encoding condition, to obtain the at least one type of media stream comprises:

determining a reference encoding optimization parameter of a reference media stream, wherein the reference media stream is obtained by performing adaptive encoding on the media data based on a reference media-stream encoding condition;

determining, based on the reference encoding optimization parameter, an encoding optimization parameter matching the at least one type of media-stream encoding condition; and performing adaptive encoding on the media data based on the at least one type of media-stream encoding condition and the matching encoding optimization parameter, to obtain the at least one type of media stream.

9. The method according to claim 1, further comprising:

when the terminal joining the interaction room for interaction triggers an update, obtaining information about a media-stream processing capability of an updated terminal; and when the information about the media-stream processing capability of the updated terminal satisfies a media-stream update condition, updating the at least one type of media stream based on the information about the media-stream processing capability of the updated terminal.

10. The method according to claim 1, wherein the performing adaptive encoding on media data in the interaction room based on the media-stream processing capability information, to obtain at least one type of media stream for the terminals in the interaction room comprises:

performing adaptive encoding on the media data in the interaction room based on the media-stream processing capability information and information about an encoding processing capability of the computer device, to obtain the at least one type of media stream for the terminals in the interaction room, wherein an entirety of the media-stream parameter of the at least one type of media stream matches the information about the encoding processing capability.

11. The method according to claim 1, wherein the obtaining, during running of the cloud application, media-stream processing capability information of terminals joining the interaction room for interaction comprises:

in response to detecting that the terminals join, via a node server, the interaction room for interaction, performing network resource detection on the terminals, to obtain the network resource information;

obtaining the device decoding information of the terminals; and obtaining the media-stream processing capability information of the terminals based on the network resource information and the device decoding information.

12. The method according to claim 1, wherein the determining a media stream matching a subset of the terminals in the interaction room comprises at least one of the followings:

determining the media stream from the at least one type of media stream based on a media-stream selection request transmitted by the subset of the terminals in the interaction room; or determining, from the at least one type of media stream, the media stream whose media-stream parameter matches the media-stream processing capability information of the subset of the terminals in the interaction room.

13. A non-transitory computer-readable storage medium, having computer-readable instructions stored therein, the computer-readable instructions, when being executed by at least one processor, causing the at least one processor to perform:

determining a cloud application and an interaction room created in the cloud application, and obtaining, during running of the cloud application, media-stream processing capability information of terminals joining the interaction room for interaction;

obtaining information about an operation instruction of the terminals joining the interaction room of the cloud application for interaction;

generating media data to be delivered to the interaction room through rendering based on the information about the operation instruction, and storing the media data in a cache;

reading the media data from the cache, and performing adaptive encoding on the media data to be delivered in the interaction room based on the media-stream processing capability information, to obtain at least one type of media stream for the terminals in the interaction room, a media-stream parameter of the at least one type of media stream matching the media-stream processing capability information;

determining a media stream to be delivered matching a subset of the terminals in the interaction room, the subset of the terminals comprising at least one of the terminals, the media stream being selected from the at least one type of media stream based on media-stream processing capability information of the subset of the terminals; and delivering the media stream to the subset of the terminals in the interaction room.

14. The storage medium according to claim 13, wherein the performing adaptive encoding on media data to be delivered in the interaction room based on the media-stream processing capability information, to obtain at least one type of media stream for the terminals in the interaction room comprises:

determining at least one type of media-stream encoding condition for the terminals in the interaction room based on the media-stream processing capability information;

obtaining the media data in the interaction room; and performing adaptive encoding on the media data based on the at least one type of media-stream encoding condition, to obtain the at least one type of media stream, wherein the media-stream parameter of the at least one type of media stream satisfies the media-stream encoding condition.

15. The storage medium according to claim 14, wherein the media-stream processing capability information comprises network resource information and device decoding information, and the determining at least one type of media-stream encoding condition for the terminals in the interaction room based on the media-stream processing capability information comprises:

determining a bit rate based on the network resource information;

determining an encoding format, a frame rate, and a resolution based on the device decoding information; and determining the at least one type of media-stream encoding condition for the terminals in the interaction room based on the bit rate, the encoding format, the frame rate, and the resolution.

16. The storage medium according to claim 14, wherein the media-stream processing capability information comprises network resource information and device decoding information, and the at least one type of media-stream encoding condition comprises at least one of an encoding format, a bit rate, a frame rate, or a resolution.

17. The storage medium according to claim 14, wherein the media stream obtained from the adaptive encoding comprises at least two types of media stream, and the performing adaptive encoding on the media data based on the at least one type of media-stream encoding condition, to obtain the at least one type of media stream comprises:

when the media-stream encoding condition comprises a same frame rate, respectively performing adaptive encoding on the media data, to obtain the at least two types of media streams, wherein media-stream parameters of the at least two types of media streams satisfy the media-stream encoding condition, and data at a same distribution location in the media streams has same timestamp information.

18. A computer device, comprising a memory and a processor, the memory having computer-readable instructions stored therein, and the processor, when executing the computer-readable instructions, being configured to perform:

determining a cloud application and an interaction room created in the cloud application, and obtaining, during running of the cloud application, media-stream processing capability information of terminals joining the interaction room for interaction;

obtaining information about an operation instruction of the terminals joining the interaction room of the cloud application for interaction;

generating media data to be delivered to the interaction room through rendering based on the information about the operation instruction, and storing the media data in a cache;

reading the media data from the cache, and performing adaptive encoding on the media data to be delivered in the interaction room based on the media-stream processing capability information, to obtain at least one type of media stream for the terminals in the interaction room, a media-stream parameter of the at least one type of media stream matching the media-stream processing capability information;

determining a media stream to be delivered matching a subset of the terminals in the interaction room, the subset of the terminals comprising at least one of the terminals, the media stream being selected from the at least one type of media stream based on media-stream processing capability information of the subset of the terminals; and delivering the media stream to the subset of the terminals in the interaction room.

19. The computer device according to claim 18, wherein the performing adaptive encoding on media data to be delivered in the interaction room based on the media-stream processing capability information, to obtain at least one type of media stream for the terminals in the interaction room comprises:

determining at least one type of media-stream encoding condition for the terminals in the interaction room based on the media-stream processing capability information;

obtaining the media data in the interaction room; and performing adaptive encoding on the media data based on the at least one type of media-stream encoding condition, to obtain the at least one type of media stream, wherein the media-stream parameter of the at least one type of media stream satisfies the media-stream encoding condition.

20. The computer device according to claim 19, wherein the media-stream processing capability information comprises network resource information and device decoding information, and the determining at least one type of media-stream encoding condition for the terminals in the interaction room based on the media-stream processing capability information comprises:

determining a bit rate based on the network resource information;

determining an encoding format, a frame rate, and a resolution based on the device decoding information; and determining the at least one type of media-stream encoding condition for the terminals in the interaction room based on the bit rate, the encoding format, the frame rate, and the resolution.

* * * * *